(12) United States Patent
Lu et al.

(10) Patent No.: US 9,042,373 B2
(45) Date of Patent: May 26, 2015

(54) DATA FLOW MOBILITY

(75) Inventors: Guang Lu, Montreal (CA); Mahmoud Watfa, Montreal (CA); Kamel M. Shaheen, King of Prussia, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 231 days.

(21) Appl. No.: 12/684,227

(22) Filed: Jan. 8, 2010

(65) Prior Publication Data

US 2010/0208698 A1    Aug. 19, 2010

Related U.S. Application Data

(60) Provisional application No. 61/143,524, filed on Jan. 9, 2009, provisional application No. 61/164,181, filed on Mar. 27, 2009.

(51) Int. Cl.
| | |
|---|---|
| *H04L 12/66* | (2006.01) |
| *H04L 12/28* | (2006.01) |
| *H04W 36/00* | (2009.01) |
| *H04W 36/14* | (2009.01) |
| *H04W 36/28* | (2009.01) |

(52) U.S. Cl.
CPC .......... *H04W 36/0027* (2013.01); *H04W 36/14* (2013.01); *H04W 36/28* (2013.01)

(58) Field of Classification Search
CPC ..... H04W 48/08; H04W 48/16; H04W 48/17; H04W 48/18; H04L 47/20; H04L 47/2441; H04L 47/2483
USPC .......... 370/328, 329, 330, 331, 332, 352, 401, 370/395.21, 395.4; 709/227, 203; 455/417, 455/435.1, 436, 438, 450, 453, 414.3; 379/211.01, 212.01
See application file for complete search history.

(56) References Cited

U.S. PATENT DOCUMENTS

| | | | |
|---|---|---|---|
| 7,539,175 B2 * | 5/2009 | White et al. | 370/350 |
| 7,650,143 B2 * | 1/2010 | Jagadeesan et al. | 455/417 |
| 8,014,367 B2 * | 9/2011 | Carlton et al. | 370/338 |
| 8,174,994 B2 * | 5/2012 | Forssell et al. | 370/252 |
| 8,224,303 B2 * | 7/2012 | White | 455/414.3 |

(Continued)

FOREIGN PATENT DOCUMENTS

| | | |
|---|---|---|
| JP | 2005-057551 A | 3/2005 |
| TW | 2008-22617 A | 5/2008 |
| TW | 200901799 A | 1/2009 |

OTHER PUBLICATIONS

Soliman et al., "Flow Movement in Mobile IPv6", Internet Draft, IETF Standard, Jun. 1, 2003, 8 pages.

(Continued)

*Primary Examiner* — Hanh N Nguyen
(74) *Attorney, Agent, or Firm* — Condo Roccia Koptiw LLP

(57) ABSTRACT

A wireless transmit/receive unit (WTRU) may communicate using a data flow that is defined according to flow identification information (FII). The WTRU may participate in the transfer of the data flow between access networks of diverse radio access technologies. The WTRU may communicate with a mobility function to obtain access network and mobility policy information. The mobility function may be, for example, an Access Network Discovery Function (ANDSF). The mobility policy information may describe the conditions by which the transfer of data flows between access networks may be permitted.

18 Claims, 13 Drawing Sheets

(56) References Cited

U.S. PATENT DOCUMENTS

| | | | |
|---|---|---|---|
| 8,289,954 | B2 | 10/2012 | Tenny et al. |
| 2006/0256751 | A1 | 11/2006 | Jagadeesan et al. |
| 2007/0064660 | A1* | 3/2007 | Qi et al. .................. 370/338 |
| 2008/0107119 | A1 | 5/2008 | Chen et al. |
| 2008/0159232 | A1 | 7/2008 | Thalanany et al. |
| 2009/0207812 | A1* | 8/2009 | Gupta et al. .................. 370/332 |
| 2009/0287764 | A1* | 11/2009 | Pazhyannur et al. ......... 709/203 |

OTHER PUBLICATIONS

3rd Generation Partnership Project (3GPP), TS 23.042, V8.4.0, "3rd Generation Partnership Project; Technical Specification Group Services and System Aspects; Architecture Enhancements for Non-3GPP Accesses (Release 8)", Dec. 2008, 7 pages.

China Mobile, "Multi Access PDN connectivity and IP flow mobility—WID," 3GPP TSG SA WG2 Meeting #67, TD S2-086386 (Aug. 2008).

Melia et al., "IEEE 802.21 Mobility Services Framework Design (MSFD)," draft-ietf-mipshop-mstp-solution-09, Internet Draft (Nov. 3, 2008).

Soliman et al., "Flow Bindings in Mobile IPv6 and Nemo Basic Support," draft-ietf-mext-flow-binding-01.txt, Internet Draft (Feb. 13, 2009).

Third Generation Partnership Project, "Technical Specification Group Services and System Aspects; Multi access PDN connectivity and IP flow mobility (Release 9)," 3GPP TR 23.xxx V0.1.0 (Nov. 2008).

Third Generation Partnership Project, "Technical Specification Group Services and System Aspects; Multi access PDN connectivity and IP flow mobility (Release 9)," 3GPP TR 23.861 V1.2.0 (May 2009).

Third Generation Partnership Project, "Technical Specification Group Services and System Aspects; Policy and charging control architecture (Release 8)," 3GPP TS 23.203 V8.4.0 (Dec. 2008).

Third Generation Partnership Project, "Technical Specification Group Services and System Aspects; Policy and charging control architecture (Release 8)," 3GPP TS 23.203 V8.8.0 (Dec. 2009).

Third Generation Partnership Project, "Technical Specification Group Services and System Aspects; Policy and charging control architecture (Release 9)," 3GPP TS 23.203 V9.3.0 (Dec. 2009).

Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.8.0 (Dec. 2009).

Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.4.1 (Dec. 2008).

Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.3.0 (Dec. 2009).

Third Generation Partnership Project, "Technical Specification Group Services and System Aspects; Architecture enhancements for non-3GPP accesses (Release 8)," 3GPP TS 23.402 V8.4.0 (Dec. 2008).

Third Generation Partnership Project, "Technical Specification Group Services and System Aspects; Architecture enhancements for non-3GPP accesses (Release 8)," 3GPP TS 23.402 V8.8.0 (Dec. 2009).

Third Generation Partnership Project, "Technical Specification Group Services and System Aspects; Architecture enhancements for non-3GPP accesses (Release 9)," 3GPP TS 23.402 V9.3.0 (Dec. 2009).

Third Generation Partnership Project, "Technical Specification Group Services and System Aspects; General Packet Radio Service (GPRS); Service description; Stage 2 (Release 8)," 3GPP TS 23.060 V8.3.0 (Dec. 2008).

Third Generation Partnership Project, "Technical Specification Group Services and System Aspects; General Packet Radio Service (GPRS); Service description; Stage 2 (Release 8)," 3GPP TS 23.060 V8.7.0 (Dec. 2009).

Third Generation Partnership Project, "Technical Specification Group Services and System Aspects; General Packet Radio Service (GPRS); Service description; Stage 2 (Release 9)," 3GPP TS 23.060 V9.3.0 (Dec. 2009).

Third Generation Partnership Project, "Technical Specification Group Services and System Aspects; Mobility between 3GPP-Wireless Local Area Network (WLAN) interworking and 3GPP systems (Release 9)," 3GPP TS 23.327 V9.0.0 (Dec. 2009).

Third Generation Partnership Project, "Technical Specification Group Services and System Aspects; Mobility between 3GPP-Wireless Local Area Network (WLAN) interworking and 3GPP systems (Release 8)," 3GPP TS 23.327 V8.2.0 (Dec. 2008).

Third Generation Partnership Project, "Technical Specification Group Core Network and Terminals; Access to the 3GPP Evolved Packet Core (EPC) via non-3GPP access networks; Stage 3; (Release 8)," 3GPP TS 24.302 V8.0.0 (Dec. 2008).

Third Generation Partnership Project, "Technical Specification Group Core Network and Terminals; Access to the 3GPP Evolved Packet Core (EPC) via non-3GPP access networks; Stage 3; (Release 8)," 3GPP TS 24.302 V8.4.1 (Dec. 2009).

Third Generation Partnership Project, "Technical Specification Group Core Network and Terminals; Access to the 3GPP Evolved Packet Core (EPC) via non-3GPP access networks; Stage 3; (Release 8)," 3GPP TS 24.302 V9.1.1 (Dec. 2009).

Takechi et al., "Network Selection and Route Management for the Mobile Networks", The Transactions of the Institute of Electronics, Information and Communication Engineers B, vol. J89-B, No. 2, Feb. 1, 2006, 11 pages.

* cited by examiner

DATA FLOW MOBILITY

CROSS REFERENCES TO RELATED APPLICATIONS

This application claims the benefit of U.S. Provisional Application No. 61/143,524, filed Jan. 9, 2009, and U.S. Provisional Application No. 61/164,181, filed on Mar. 27, 2009, each of which is hereby incorporated by reference herein in its entirety.

TECHNICAL FIELD

The disclosed subject matter relates to wireless communications.

BACKGROUND

Wireless technologies such as Service Architecture Evolution (SAE)/Evolved Packet Core (EPC) technology address how a core network may be accessed via radio access technologies of various types. For example, a SAE/EPC core network may be accessed via an air interface based on a technology such as Evolved UMTS Terrestrial Radio Access Network (E-UTRAN), Institute of Electrical and Electronics Engineers (IEEE) Wireless Local Area Network (WLAN), Code Division Multiple Access 2000 (CDMA2000), or IEEE Worldwide Interoperability for Microwave Access (WiMax).

A number of approaches have been developed to facilitate transitions between different types of radio access technologies. The Access Network Discovery and Selection Function (ANDSF), for example, is a server that stores and provides inter-system mobility policy and access network discovery information. IEEE 802.21, also referred to as Media Independent Handover (MIH), provides a framework that facilitates mobility of wireless transmit/receive units (WTRUs) between heterogeneous access networks. MIH includes an MIH information server that provides handover policies and access network information to facilitate network selection and handover decisions. Using the ANDSF and/or MIH, a WTRU may remain in communication with a core network while transitioning between access networks of different technology types.

When a WTRU transmits/receives data via a core network, it may do so by using one or more data flows. In the context of Long Term Evolution (LTE), efforts have been made to allow WTRUs to communicate by using Internet Protocol (IP) flows, which are data flows that include IP data. As an example, a WTRU may simultaneously engage in distinct IP flows related to a video telephony call, a non-conversational video stream, and a peer-to-peer (P2P) download. A single application may transmit and/or receive data related to a single IP flow or multiple IP flows. A WTRU may communicate using IP flows over multiple access networks simultaneously, and multiple IP flows related to the same application may be used over different access networks.

Although efforts have been made to facilitate the use of data flows such as IP flows in the context of heterogeneous access networks, these efforts include a number of shortcomings. For example, these efforts do not adequately address how the selective handover of data flows between access networks of different technology types, as well as other related functions, may be performed. As further examples, these efforts do not adequately address how data flows may be defined and how data used in the handover of data flows may be stored and communicated. Accordingly, new technologies are required that address the above-listed shortcomings as well as other shortcomings of the current technology.

SUMMARY

A WTRU may include a processor configured to make a determination to transfer a data flow from a first access network of a first RAT to a second access network of a second RAT. The determination may be based on mobility policy information. The WTRU may further comprise a transmitter configured to transmit a message that requests the transfer of the data flow from the first access network to the second access network. The message may additionally include flow identification information associated with the data flow.

A method for use in a WTRU may include making a determination to transfer a data flow from a first access network of a first RAT to a second access network of a second RAT. The determination may be based on mobility policy information. The WTRU may transmit a message requesting transfer of the data flow from the first access network to the second access network. The message may additionally include flow identification information associated with the data flow. The WTRU may participate in the transfer of the data flow from the first access network to the second access network.

A mobility function may include a receiver configured to receive WTRU status information from a WTRU. The mobility function may also include a processor configured to update mobility policy information based on the WTRU status information. The mobility policy information may include data flow mobility information. The mobility function may also include a transmitter configured to transmit the mobility policy information to the WTRU.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of device capable of operating in a wireless environment. When referred to hereafter, the terminology "base station" includes but is not limited to a Node-B, an Evolved Node-B (eNB), a site controller, an access point (AP), or any other type of interfacing device capable of operating in a wireless environment.

When referred to hereafter, the terminology "mobility function (MF)" is a logical node in a network. A MF may be implemented on a single electronic device, or may be implemented across two or more electronic devices. A MF may be, for example, an Access Network Discovery Function (ANDSF) or an IEEE 802.21 Media Independent Handover (MIH) server. Alternatively, a MF may implement a subset of ANDSF functionality or MIH functionality, or a subset of a combination of ANDSF and MIH server functionality. Additionally or alternatively, a MF may implement additional functionality outside of the scope of ANDSF and/or MIH server functionality.

When referred to hereafter, the terminology "data flow" refers to any unidirectional or bi-direction sequence of related data. When referred to hereafter, the terminology "IP flow" refers to a data flow that includes data transmitted or received using IP.

Figure 1:
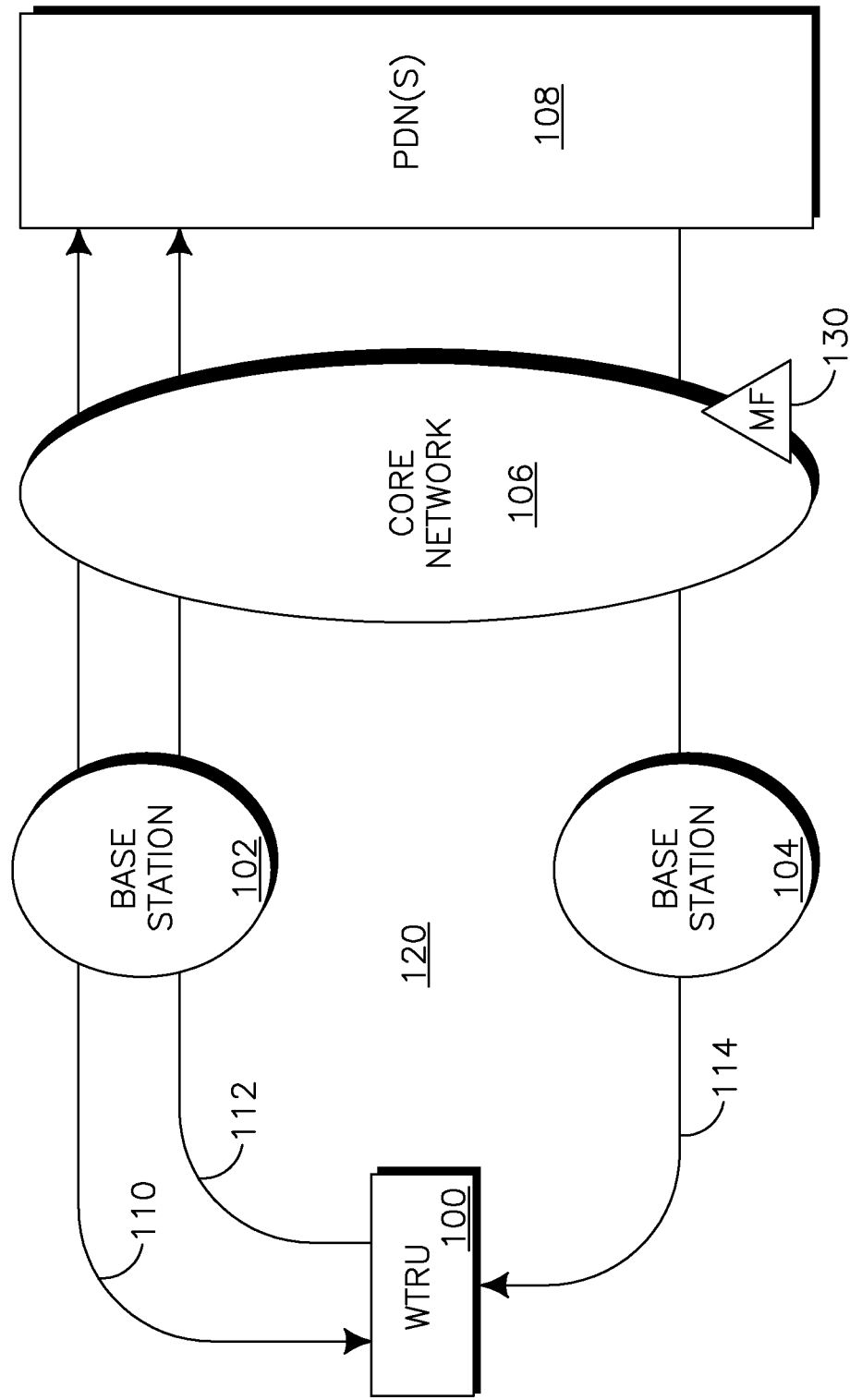
FIG. 1 shows an example architecture for the communication of wireless data using data flows.

FIG. 1 shows an example architecture 120 for the communication of wireless data using data flows. The example architecture 120 may include a WTRU 100, a first base station 102, a second base station 104, a core network 106, and one or more packet data networks (PDNs) 108. The WTRU 100 may communicate with the first base station 102 via a first air interface and may communicate with a second base station 104 via a second air interface. The base stations 102, 104 may be connected to the core network 106. The core network 106 may be connected to the one or more PDNs 108. The WTRU 100 may transmit and/or receive data from one of the PDNs 108 using a first data flow 110. Data in the first data flow 110 may be communicated via the core network 106 and the first base station 102 to/from the WTRU 100. The WTRU may transmit data to one of the PDNs 108 using a second data flow 112. Data in the second data flow 112 may be communicated via the first base station 102 and the core network 106 to one of the PDNs 108. The WTRU 100 may receive data from one of the PDNs 108 using a third data flow 114. Data in the third data flow 114 may be communicated via the core network 106 and the second base station 104 to the WTRU 100. The first base station 102 and second base station 104 may be capable of communicating with the WTRU 100 using different access technologies. Purely by way of example, the first base station 102 may be capable of communicating with the WTRU 100 using cellular technology, while the second base station 104 may be capable of communicating with the WTRU 100 using WLAN technology, although any combination of access technologies may be used.

The core network 106 may include a MF 130. The MF 130 may provide data to the WTRU 100 regarding access networks the WTRU 100 may use to access the core network 106, referred to hereafter as "access network information."

The MF 130 may provide access network information that includes parameters such as but not limited to: the access technology type of a network; a network identifier of a network, channel information for a network; carrier frequencies for a network; Quality of Service (QoS) characteristics of a network; or other parameters.

The MF 130 may additionally store information related to the transfer of WTRUs between access networks, referred to hereafter as "mobility policy information." Mobility policy information include parameters such as but not limited to: when transitions between access networks is allowed or restricted; the preferred access technology type or access network for accessing the core network 106; whether a type of access technology is preferred over a different type of access technology; whether a specific access network is preferred over a different access network; whether mobility is restricted from one access technology type to another; or whether mobility between access networks is restricted when a condition is met.

In addition to or as alternatives to the parameters described above, mobility policy information may include information related to the transfer of data flows between access networks, referred to hereafter as "data flow mobility information." Data flow mobility information may include parameters such as but not limited to: whether data flow mobility between access networks is permitted for a particular WTRU; whether data flow mobility between access networks is supported by the operator of the core network 106; the preferred type of access network for a particular type of application; preferences regarding which service types should be used on which access networks; supported QoS parameters for access networks; whether connectivity to multiple PDNs is permitted over a type of access network; a maximum number of PDN connections for an access network or type of access network; whether a particular PDN may be connected to via an access network or type of access network; the maximum number of simultaneous access networks or maximum number of simultaneous types of access technologies that may be used by the WTRU 100 to access the core network 106; whether Mobile IP (MIP) is supported; what version of MIP (for example, MIPv4, MIPv6, and/or Proxy MIP (P-MIP)) is supported.

As examples of preferred types of access network for particular types of applications, an application such as email may be preferred on cellular access networks (or a particular type of cellular access network) while applications such as gaming may be preferred on a WLAN. As examples of preferences regarding which service types should be used on which access networks, real-time applications may be preferred on cellular access networks (or a particular type of cellular access network), and background applications (such as an FTP client) may be preferred on a WLAN.

The MF 130 may provide access network and/or mobility policy information to the WTRU 100 via a query/response mechanism. Alternatively or additionally, the MF 130 may be able to provide access network and/or mobility policy information to the WTRU 100 via a push mechanism. The WTRU 100 may make mobility decisions based on the access network information and/or the mobility policy information. Alternatively or additionally, the MF 130 may send commands to the WTRU 100, indicating when transitions between access networks should be performed.

The MF 130 may send information to the WTRU 100 that indicates a trigger for initiating a query by the WTRU 100 for access network and/or mobility policy information. The WTRU 100 may store the query trigger and, upon the occurrence of a condition specified by the trigger, the WTRU may send a query for access network and/or mobility policy information to the MF 130. Alternatively, the WTRU 100 may initialize triggers without receiving the trigger information from the MF 130. In an instance where the MF 130 sends trigger information to the WTRU 100, the MF 130 may do so during registration/initialization of the WTRU with the MF 130. Alternatively or additionally, the MF 130 may send trigger information at any time after registration/initialization, in order to add new triggers, modify triggers, or delete triggers.

A query trigger may be triggered based on the occurrence of one or more events such as but not limited to: an initial power-up of the WTRU 100; expiration of a time period or a recurring time period; change in location of the WTRU 100; change of access network of the WTRU 100; change of battery power level of the WTRU 100; change of applications running on the WTRU 100; the reception of access network information and/or mobility policy information by the WTRU 100 from the MF 130.

Although FIG. 1 shows the MF 130 as included in the core network 106, the MF 130 may also be implemented outside of the core network 106 but be in communication with one or more nodes in the core network 106.

In the example architecture of FIG. 1, a data flow may be identified by one or more parameters, collectively referred to as Flow Identification Information (FII). FII may include, for example, a data flow identifier (flow ID). A data flow ID may be a unique integer or other data type, and may be created when its associated data flow is created. FII may additionally include one or more of: a source IP address associated with the data flow; a destination IP address associated with the data flow; one or more source port numbers associated with the data flow; one or more destination port numbers associated with the data flow; one or more protocol identifiers that identify one or more protocols used in the data flow; an identifier of the type of access network that the data flow uses (e.g., UTRAN, E-UTRAN, GERAN, WLAN, WiMax, or any other access network type); an access network identifier; a radio bearer identifier; a core network bearer identifier such as an Evolved Packet System (EPS) bearer identifier; a PDN Gateway identifier; an operator identifier; an Access Point Name (APN); a country code; a region code; an application identifier; an application type identifier; an identifier of the IP version used in the data flow (e.g., IPv4 or IPv6); an identifier associated with a mobility protocol associated with the data flow (for example, MIP or P-MIP); or a QoS required by the data flow. An application type identifier may identify whether an application that has data that is communicated on the data flow is, for example, a Voice over IP (VoIP) application, streaming video application, or other type application.

FII may additionally include information related to the grouping of data flows in flow groups. For example, a data flow may be associated with one or more flow groups, and FII for the data flow may include identifiers of the flow groups with which the data flow is associated. Data flows with common attributes may be grouped based on the common attributes. Attributes which may be used to define flow groups include: the access network or type of access network through which the data flows in the group are communicated; the application or type of application with which the data flows in the group are associated; a QoS required by data flows in the group; or any other data flow attribute otherwise included in FII. A data flow may be included in multiple groups.

Figure 2:
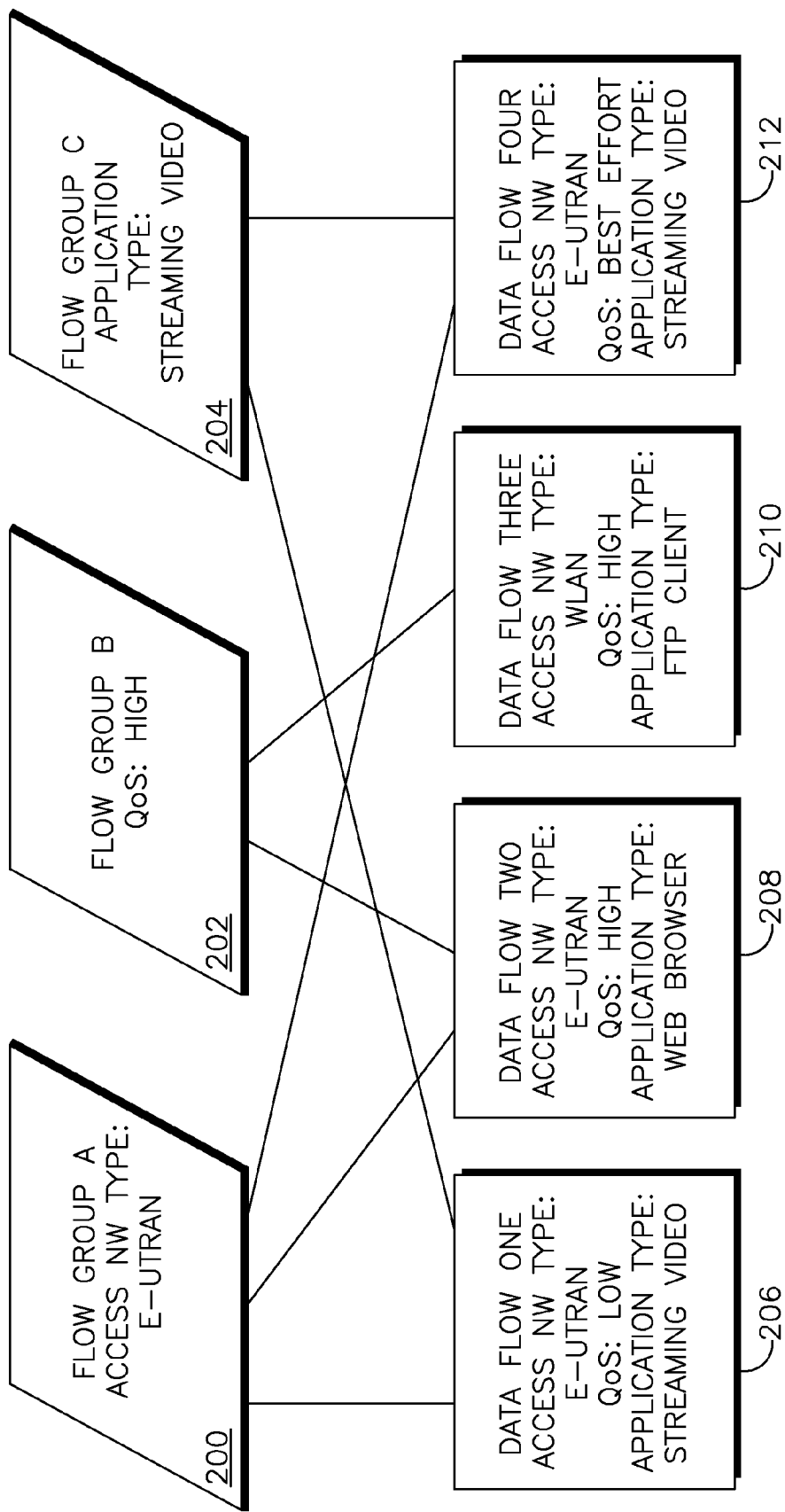
FIG. 2 shows an example of the grouping of data flows.

FIG. 2 shows an example of how data flows may be grouped. FII for Data Flow One 206 indicates that Data Flow One 206 is associated with an E-UTRAN access network type, a low QoS, and a streaming video application type. FII for Data Flow Two 208 indicates that Data Flow Two 208 is associated with an E-UTRAN access network type, a high QoS, and a web browser application type. FII for Data Flow Three 210 indicates that Data Flow Three 210 is associated with a WLAN access network type, a high QoS, and a File Transfer Protocol (FTP) application type. FII for Data Flow Four 212 indicates that Data Flow Four 212 is associated with an E-UTRAN access network type, a best effort QoS, and a streaming video application type. Data Flow One 206, Data Flow Two 208, and Data Flow Four 212 are included in Flow Group A 200, which is based on an E-UTRAN access network type attribute. Data Flow Two 202 and Data Flow Three 210 are included in Flow Group B 202, which is based on a high QoS attribute. Data Flow One 206 and Data Flow Four 212 are included in Flow Group C 204, which is based on a streaming video application type.

Referring again to FIG. 1, FII may be stored at the WTRU 100, at one or more base stations 102, 104, or in any node in or connected to the core network 106. FII may be created by the WTRU 100 or other components 100, 102, 104, 106 in the example architecture when a flow is created. Alternatively, FII may be created when a construct associated with a data flow (such as, for example, a bearer or a PDP context) is created. The example architecture 120 may support the transfer of data flows between different access networks. Data flows may be transferred on an individual or group basis.

In addition to or as an alternative to the use of FII, access network information, and/or mobility policy information, the WTRU 100 may provide information to the MF 130 related to the state of the WTRU and/or capabilities of the WTRU, collectively referred to as "WTRU status information." WTRU status information may include parameters such as but not limited to: access networks to which the WTRU 100 is connected; an IP address of the WTRU 100; any FII parameters associated with any data flows used by the WTRU 100; applications running on the WTRU and parameters related to the applications (such as application IDs, types of applications, and QoS parameters related to the applications); a location of the WTRU 100; statistics on the usage of mobility policy information by the WTRU 100; reports indicating real-time losses and/or gains of access connectivity to networks (based on, for example, the activation/deactivation of a radio at the WTRU 100); reports indicating QoS received by the WTRU 100; reports from the WTRU 100 comparing received QoS versus expected QoS; reports from the WTRU 100 comparing received QoS versus expected QoS on a per-application and/or per-RAT basis; or preferences of the WTRU 100 for a particular access network or type of access network.

The WTRU 100 may send WTRU status information to the MF 130 via any access network to which the WTRU 100 is connected. The WTRU may provide the information periodically. The time period may be specified by signaling between the WTRU 100 and the MF 130, may be a hard-coded value at the WTRU, or may be determined by the WTRU 100 based on one or more triggers. Information defining WTRU status information triggers may be sent from the MF 130 to the WTRU 100. WTRU status information triggers may be based on the occurrence of any event described above with respect to query triggers, or on one or more other events. Alternatively or additionally, the WTRU 100 may send a request to the MF 130 to move a data flow between access networks. This request may be based on, for example, mobility policy information received from the MF 130. Alternatively or additionally, the request may be based on the WTRU 100 being aware that it is moving away from an access network and/or moving within range of a new access network. In response to the request, the MF 130 and/or one or more other nodes in the core network 106 may send a command to the WTRU 100, indicating that the WTRU 100 should move the data flow between access networks.

The MF 130 may adjust mobility policy information and/or make handover decisions based on the information received from the WTRU 100. For example, if statistics on the usage of mobility policy information by the WTRU 100 indicate that the WTRU 100 is frequently transitioning between access networks, then the MF 130 may modify the mobility policy information to indicate that the WTRU should connect to an access network with a wider coverage average area. This may occur, for example, in an instance where mobility policy information favors an access network type with a smaller coverage area, such as WLAN; the mobility policy information could be modified to prioritize E-UTRAN accesses over WLAN accesses.

The example architecture 120 of FIG. 1 shows two base stations 102, 104, though any number of base stations may be used in the example architecture 120. The core network 106 may be based on a technology such as, for example, SAE, UMTS, WiMax, or any other suitable core network technology. The core network 106 may include and/or be connected to or more network nodes in addition to the IMF 130, such as such as a Home Location Register (HLR), Home Subscriber Server (HSS), Policy and Charging Rules Function (PRCF), Serving Gateway (SGW), PDN Gateway (PDN GW), Mobility Management Entity (MME), a mobility management server, or other network nodes, which may store and/or communicate FII, flow mobility information, and/or WTRU status information. Although FIG. 1 shows three data flows 110, 112, 114, the WTRU may communicate using any number of data flows through any combination of access networks.

In various implementations, radio access technologies (RATs) which may be implemented in the WTRU 100 and base stations 102, 104 include but are not limited to technologies such as: WLAN; CDMA2000; UTRAN; WCDMA; WiMAX; Global System for Mobile Communications (GSM); GSM Enhanced Data Rates For GSM Evolution (EDGE) Radio Access Network (GERAN); Wireless Broadband (WiBro); E-UTRAN; and LTE Advanced.

In various implementations, any combination or sub-combination of the access network information, mobility policy information, WTRU status information, and/or FII parameters described above with reference to FIGS. 1 and 2 may be used.

Figure 3:
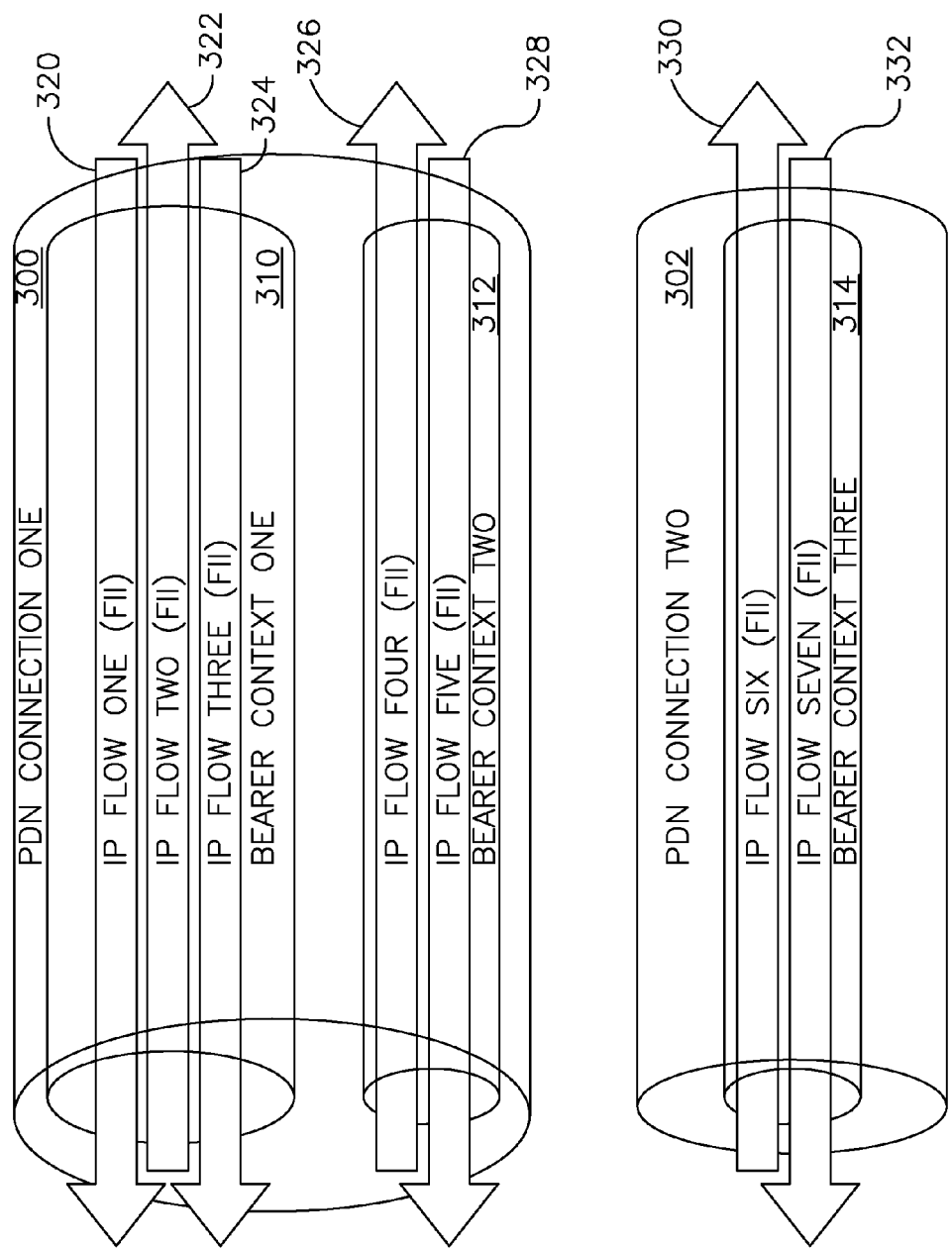
FIG. 3 shows an example of how data flows may be used in the context of an LTE system.

FIG. 3 shows an example of how data flows may be used in the context of an LTE system. In an LTE system, a WTRU may have one or more Packet Data Connections (PDNs), each of which provides an IP data path to a PDN. A PDN connection may include one or more bearer contexts, and each bearer context may be used to transmit/receive data for one or more IP flows.

In the example of FIG. 3, Packet Data Network (PDN) Connection One 300 is a PDN connection from a WTRU (not depicted) to a first PDN (not depicted). PDN Connection Two 302 is a PDN connection from the WTRU to a second PDN (not depicted). PDN Connection One 300 may include Bearer Context One 310 and Bearer context Two 312. In Bearer Context One 310, three unidirectional data flows (IP flows) (IP Flow One 320, IP Flow Two 322, and IP Flow Three 324) are used for the transmission or reception of data. In Bearer Context Two 312, two IP flows (IP Flow Four 326 and IP Flow Five 328) are used for the transmission or reception of data. PDN Connection Two 302 may include Bearer Context Three 314. In Bearer Context Three 314, two IP flows (IP Flow Six 330 and IP Flow Seven 332) are used for the transmission or reception of data. The WTRU may transmit/receive data on PDN Connection One 300 and PDN Connection Two 302 using two different access networks (one PDN connection per access network), or on the same access network. Each of the IP flows 320, 322, 324, 326, 328, 330, 332 may be associated with FII as described above with reference to FIGS. 1 and 2.

Figure 4:
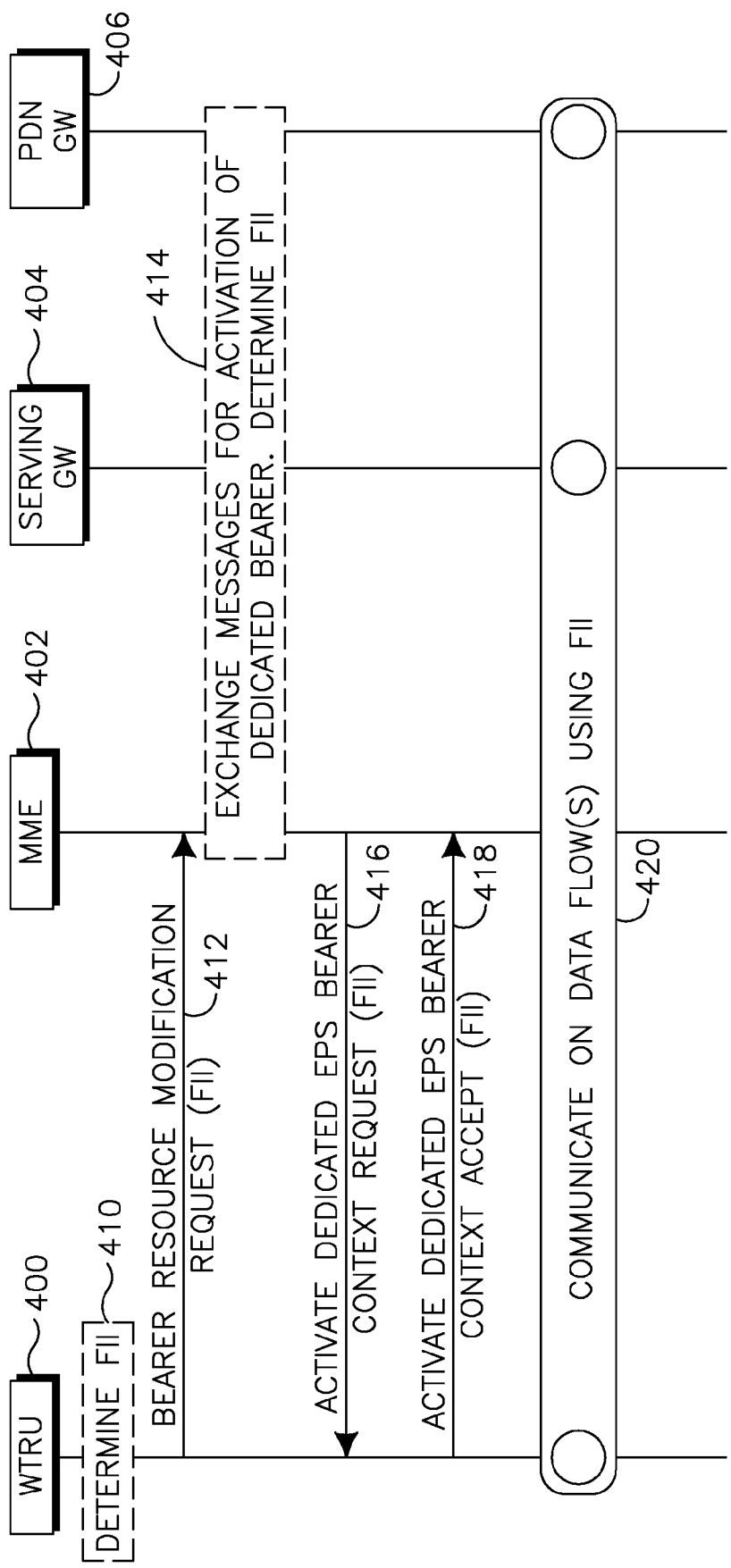
FIG. 4 shows a first method for data flow creation that may include the use of flow identification information.

FIG. 4 shows a method for data flow creation that may include the use of FII. FIG. 4 shows a WTRU 400, a MME 402, a Serving Gateway 404, and a PDN Gateway 406. The MME 402, Serving Gateway 404, and PDN Gateway 406 may be included in a core network (not depicted). The WTRU 400 may communicate with the MME 402, Serving Gateway 404, and PDN Gateway 406 via an access network such as an E-UTRAN.

The WTRU 400 may make a determination to create one or more data flows, and may determine FII parameters used to define the data flows (step 410). The WTRU 400 may send a message that indicates a request for the creation of a dedicated bearer (step 410). The message may be, for example, a BEARER RESOURCE MODIFICATION REQUEST message. The message may include the FII parameters related to the one or more data flows.

The MME 402, Serving Gateway 404, and PDN Gateway 406 may exchange one or more messages related to the activation of the dedicated bearer. The one or more messages may include one or more FII parameters. One or more of the MME 402, the Serving Gateway 404, and the PDN Gateway 406 may determine FII parameters used to define the one or more data flows. These FII parameters may be in addition to any FII parameters included in the message sent from the WTRU 400 to the MME 402 (step 412).

The MME 402 may send a message to the WTRU 400 indicating a request for the activation of a dedicated bearer context (step 416). The message may be, for example, an ACTIVATE DEDICATED EPS BEARER CONTEXT REQUEST message. The message may include FII parameters used to define the one or more data flows as determined by the MME 402, the Serving Gateway 404, the PDN Gateway 406, and/or the WTRU 400.

The WTRU may then send a message indicating an acknowledgement of the activation of a dedicated bearer context (step 420). The message may be, for example, an ACTIVATE DEDICATED EPS BEARER CONTEXT ACCEPT message. The message may include FII parameters used to define the one or more data flows as determined by the MME 402, the Serving Gateway 404, the PDN Gateway 406, and/or the WTRU 400.

The WTRU 400 may then transmit and/or receive data on the one or more data flows defined according to the FII parameters included in the messages as described above (step 420). The Serving Gateway 404 and PDN Gateway 406 may also participate in the one or more data flows. The one or more data flows may be, for example, IP flows.

FII parameters may be determined at one or more of the WTRU 400, the MME 402, the Serving Gateway 404, or the PDN Gateway 406. In various implementations, each of the messages described above with reference to FIG. 4 (in steps 412, 416, and 418) may or may not include FII parameters.

The creation of a data flow such as that described above with reference to FIG. 4 may include the creation of a packet filter on the bearer associated with the flow. A bearer may be associated with one or more Traffic Flow Templates (TFTs). A TFT may include one or more packet filters. A TFT may be associated with the uplink and may be implemented at the WTRU 400. Alternatively, a TFT may be associated with the downlink and implemented in a network node such as the PDN Gateway 406, or other network node. Packet filters may be used to map data onto the correct bearer. The BEARER RESOURCE MODIFICATION REQUEST message (step 412) may include a request for the creation of a packet filter that corresponds to the data flow. Depending upon the implementation, creation of a packet filter may initiate creation of corresponding FII. Alternatively, creation of FII may initiate the creation of a corresponding packet filter. Accordingly, a packet filter corresponding to the data flow described with reference to FIG. 4 may be created at any point during the method shown in FIG. 4.

Figure 5:
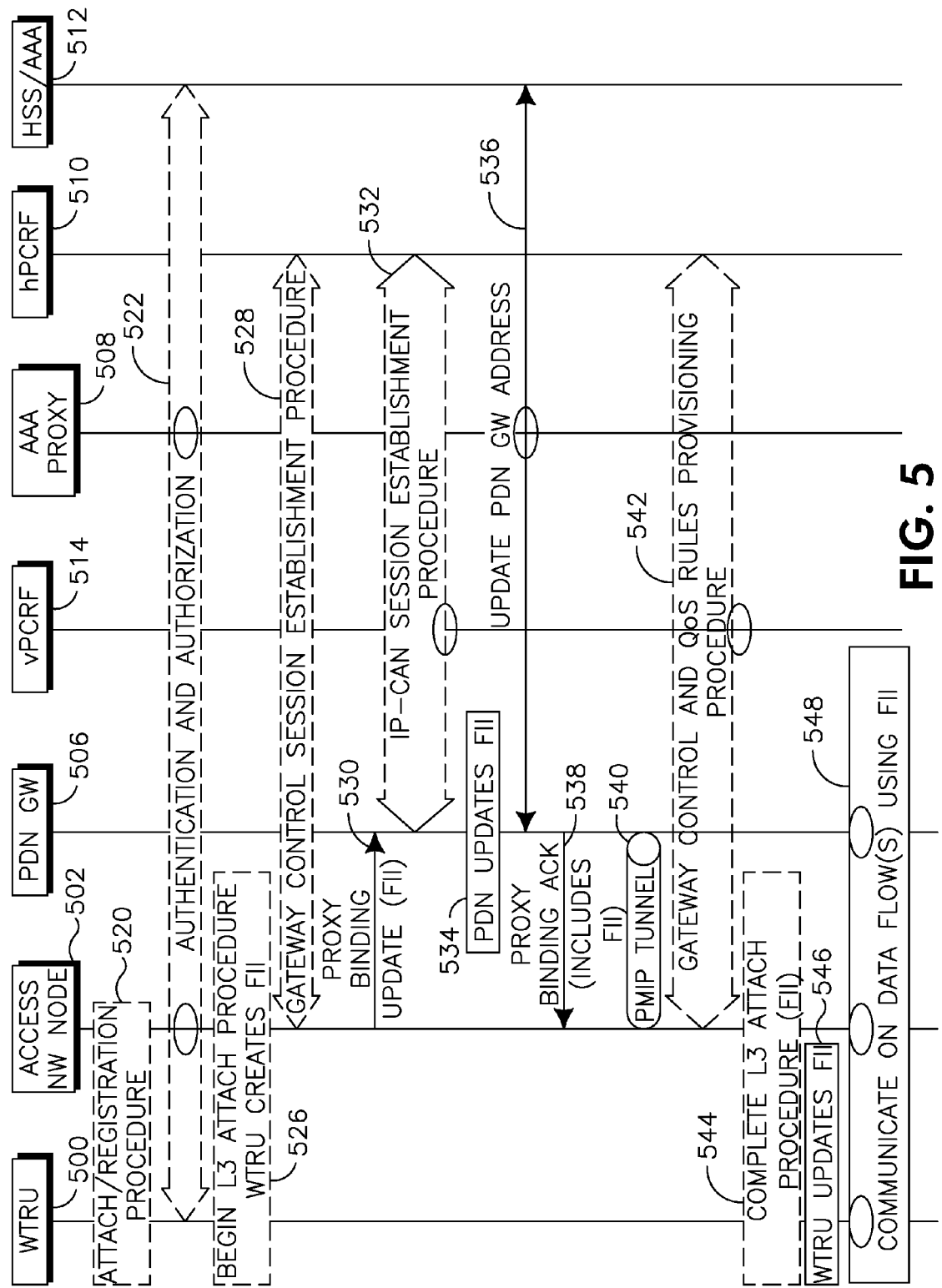
FIG. 5 shows a second additional method for data flow creation that may include the use of flow identification information.

FIG. 5 shows an additional method for data flow creation that may include the use of FII. FIG. 5 shows a WTRU 500, an access network node 502, a PDN Gateway 506, a Visited Policy and Charging Rules Function (vPCRF) 514, an Authentication, Authorization and Accounting (AAA) Proxy 508, a Home Policy and Charging Rules Function (hPCRF), and a Home Subscriber Server (HSS)/AAA server 512. The access network node 502 may be a base station, access router, or other network node. In various implementations, the access network node 502 may be, for example, a CDMA2000 Packet Data Service Node (PDSN), a WiMax Access Service Node (ASN), or WLAN access router. The access network node 502 may participate in providing an air interface to the WTRU 500. The access network node 502 and the WTRU 500 may communicate using a technology such as, for example, WLAN, CDMA2000, WiMAX, or any other technology.

The WTRU 500 and access network node 502 may perform an attach and/or registration procedure to establish communications (step 520). This may include, for example, the establishment of a Layer One (L1) and/or Layer Two (L2) links. The WTRU 500, access network node 502, HSS/AAA server 512, and/or the AAA Proxy 508 may perform an authentication and authorization procedure (step 522). This procedure may be or may include an Extensible Authentication Protocol (EAP) authentication procedure.

After authentication, the WTRU 500 and access network node 502 may begin a Layer Three (L3) attach procedure. The WTRU 500 may create one or more FII parameters related to one or more data flows (step 526). The data flows may be, for example, IP flows. The access network node 502 and hPCRF 510 perform a Gateway Control Session Establishment Procedure (step 528). The access network node 502 sends a proxy binding update message to the PDN Gateway 506 (step 530). The proxy binding update message may include the one or more FII parameters created by the WTRU 500.

The PDN Gateway 506, vPCRF 514, and hPCRF 510 may perform an Internet Protocol-Connectivity Access Network (IP-CAN) session establishment procedure (step 532). The PDN Gateway 506 then updates the FII parameters (step 534). This may include, for example, the PDN Gateway 506 filling in FII parameters based on information that it stores. The HSS/AAA server 512, and/or the AAA Proxy 508 may perform an update of the PDN Gateway address (step 536). This may include the PDN Gateway sending a message to the HSS/AAA Server 512 indicating its PDN Gateway identity and an Access Point Name (APN). Information included in the message may be stored in the HSS/AAA server 512.

The PDN Gateway 506 may send a proxy binding acknowledgement message to the access network node 502 (step 538). The proxy binding acknowledgment message may include one or more FII parameters. The PDN Gateway 506 and the access network node 502 then establish a PMIP tunnel (step 540). The access network node 502, vPCRF 514, and hPCRF 510 may perform a gateway control and QoS rules provisioning procedure (step 542). The procedure may be, for example, a GW Control Session Modification procedure.

The WTRU 500 and access network node 502 may then complete the L3 attach procedure (step 544). This may include, for example, the exchange of one or more messages that include FII parameters. The WTRU 500, via the access network node 502 and the PDN Gateway 506, may then communicate data on one or more data flows based on the FII (step 548). In an instance where the WTRU 500 stores FIT, the WTRU 500 may update its stored FII to reflect the created data flows.

Figure 6:
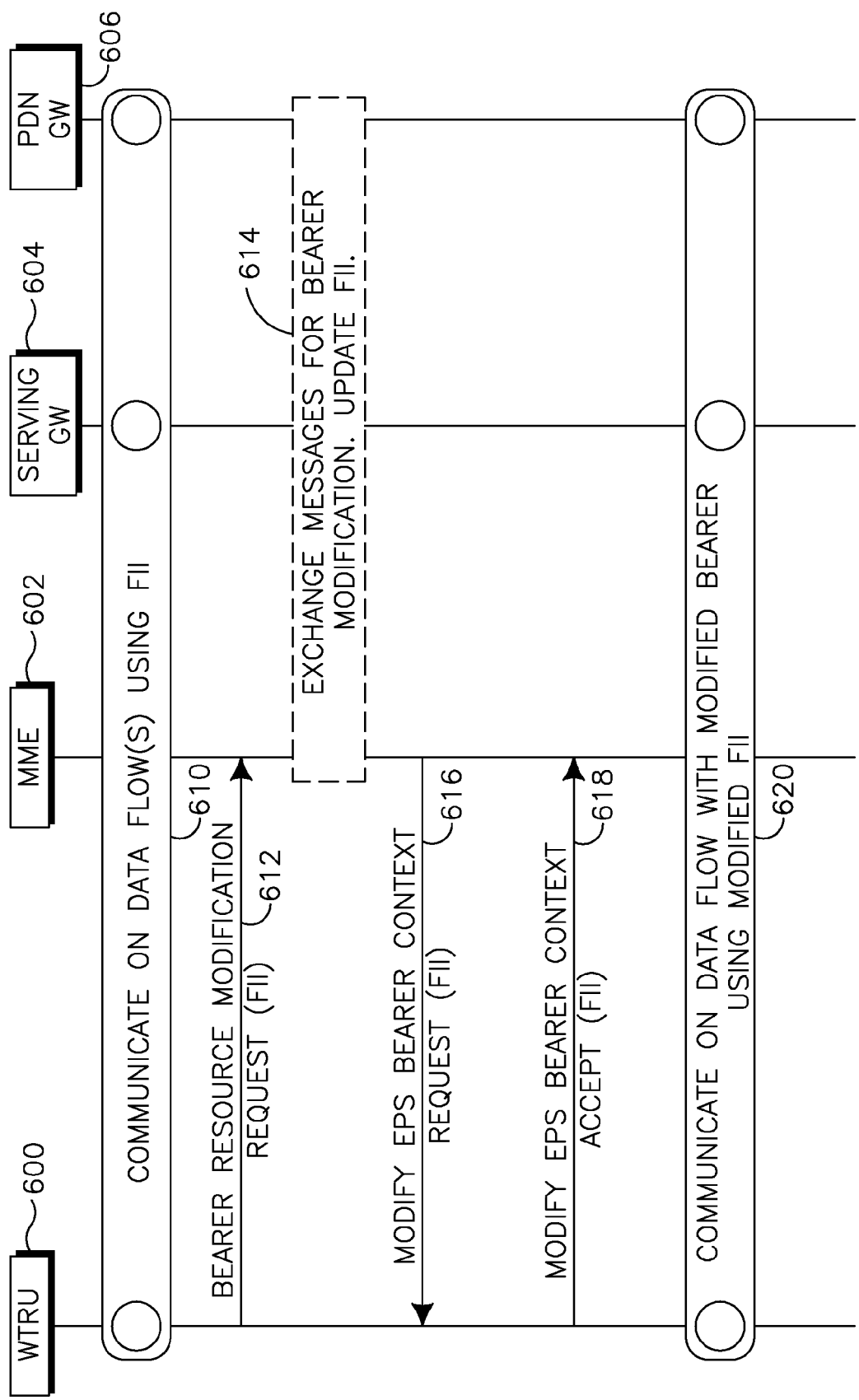
FIG. 6 shows an example method for the modification of a data flow and the corresponding modification of flow identification information.

A data flow (and the FII associated with it) may be modified at any time. For example, an attribute of a data flow may change and FII stored at a WTRU and/or in one or more network nodes may be updated to reflect the change. Alternatively or additionally, FII may be updated when a data flow is handed over from one access network to another. FIG. 6 shows an example method for the modification of a data flow and the corresponding modification of FII.

FIG. 6 shows a WTRU 600, an MME 602, a Serving Gateway 604, and a PDN Gateway 606. The WTRU 600 may communicate on a data flow via the Serving Gateway 604 and the PDN Gateway 606 (step 610). The data flow may be, for example, an IP flow. The data flow may be associated with corresponding FII.

The WTRU 600 may send a message to the MME 602 to request the modification of a bearer context used by the data flow (step 612). The message may be, for example, a BEARER RESOURCE MODIFICATION REQUEST message. The message may include one or more FII parameters related to the data flow. The MME 602, Serving Gateway 604, and PDN Gateway 606 may exchange on or more messages to update the bearer according to the request message (step 614). In an instance where the MME 602, Serving Gateway 604, and/or PDN Gateway 606 store FII, they may update the stored FII (step 614).

The MME 602 may then send a message to the WTRU 600 to request modification of the bearer context (step 616). The message may be, for example, a MODIFY EPS BEARER CONTEXT REQUEST message. The message may include one or more FII parameters.

The WTRU 600 may then transmit a message to the MME 602 to acknowledge the modification of the bearer context (step 618). The message may be, for example, a MODIFY EPS BEARER CONTEXT ACCEPT message. The message may include one or more FII parameters. The WTRU 600 may then communicate on the data flow via the Serving Gateway 604 and the PDN Gateway 606, using the modified bearer and corresponding modified FII (step 620). In an instance where the WTRU 600 stores FII, the WTRU 600 may update its stored FII to reflect the changes in the data flow.

In an instance where a data flow is associated with a packet filter, modification of a data flow as described above with reference to FIG. 6 may include the modification of the corresponding packet filter. Depending upon the implementation, modification of a packet filter may initiate the modification of corresponding FII. Alternatively, modification of FII may initiate the modification of the corresponding packet filter. Accordingly, a packet filter corresponding to the data flow described with reference to FIG. 6 may be modified at any point during the method shown in FIG. 6.

A data flow (and its corresponding FII) may also be deleted at any time. For example, when a connection via an access network is terminated, data flows communicated over the access network may be deleted. A connection via an access network may be intentionally terminated (through a network detach procedure), or through an unintentional loss of service via an access network. The deletion of a data flow may be initiated by a WTRU, or by one or more network nodes such as an MME, a Serving Gateway, or a PDN Gateway. When a connection via an access network is terminated (via a network detach procedure or otherwise), all the flows associated with the access network may be deleted. Alternatively or additionally, a flow may be deleted in response to handover between access networks.

When a data flow deletion is initiated by a WTRU, the WTRU may notify network nodes that store FII so that the network nodes may update their FII accordingly. Deletion of a data flow (whether initiated by a WTRU and/or a network node) may initiate a core network bearer modification procedure, and/or may initiate a radio bearer modification procedure. If, for example, all of the flows on a core network bearer are deleted, a core network bearer deletion procedure may be initiated, followed by a radio bearer deletion procedure. A core network bearer modification procedure that may be initiated may be, for example, an EPS bearer modification procedure.

Figure 7:
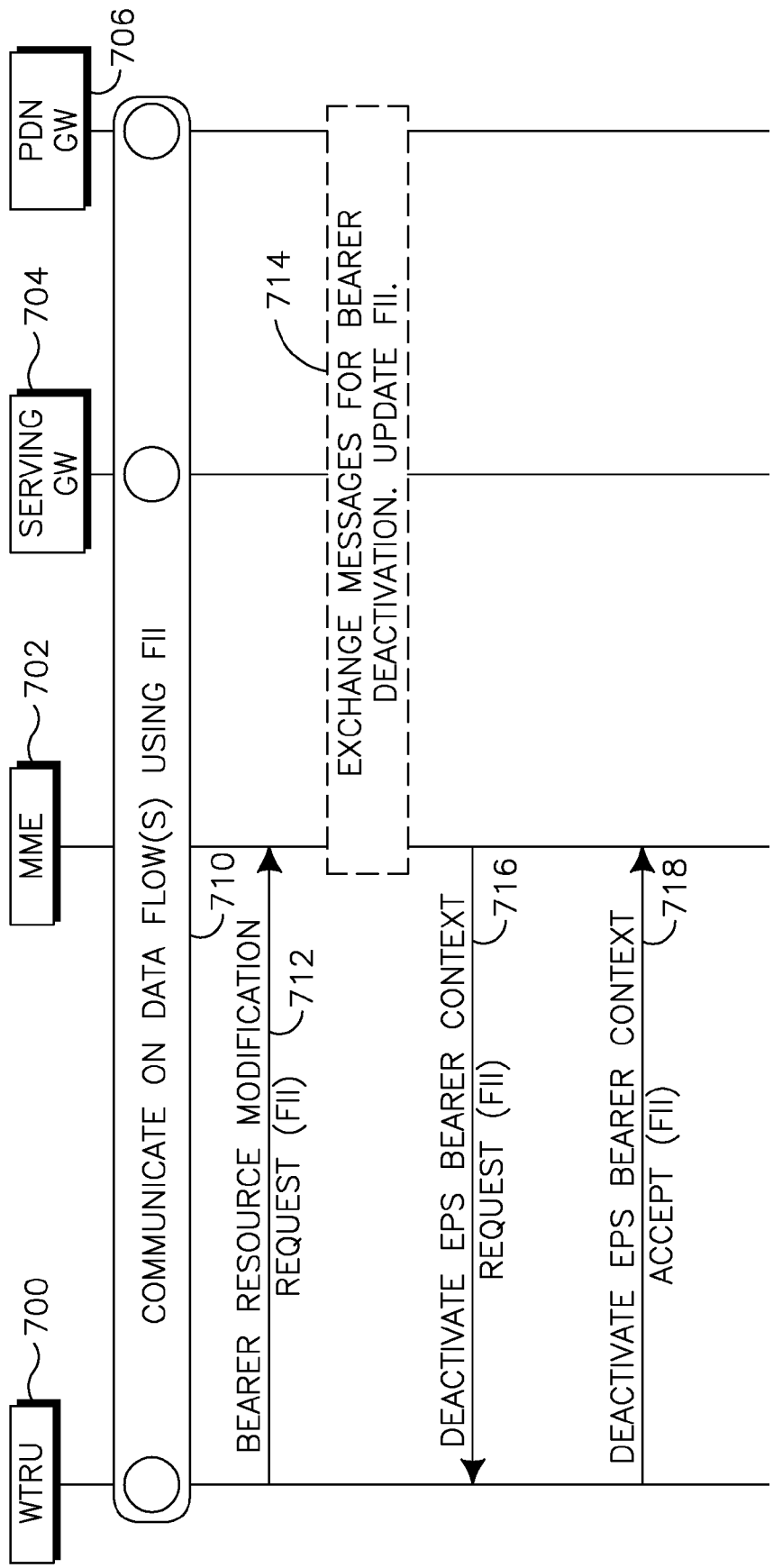
FIG. 7 shows an example method for the deletion of a data flow and the corresponding deletion of flow identification information.

FIG. 7 shows an example method for the deletion of a data flow and the corresponding deletion of FII. FIG. 7 shows a WTRU 700, an MME 702, a Serving Gateway 704, and a PDN Gateway 706. The WTRU 700 may communicate on a data flow via the Serving Gateway 704 and the PDN Gateway 706 (step 710). The data flow may be, for example, an IP flow. The data flow may be associated with corresponding FII.

The WTRU 700 may send a message to the MME 702 to request the deactivation of a core network bearer context used by the data flow (step 712). The message may be, for example, a BEARER RESOURCE MODIFICATION REQUEST message. The message may include one or more FII parameters related to the data flow. The MME 702, Serving Gateway 704, and PDN Gateway 706 may exchange on or more messages to update the bearer according to the request message (step 714). In an instance where the MME 702, Serving Gateway 704, and/or PDN Gateway 706 store FII, they may delete the stored FII related to the data flow and/or update their stored FII to indicate that the data flow is inactive/deleted (step 714).

The MME 702 may then send a message to the WTRU 700 to request deactivation of a radio bearer context associated with the deactivated core network bearer (step 716). The message may be, for example, a DEACTIVATE DEDICATED BEARER CONTEXT REQUEST message. The message may include one or more FII parameters.

The WTRU 700 may then transmit a message to the MME 702 to acknowledge the modification of the bearer context (step 718). The message may be, for example, a DEACTIVATE EPS BEARER CONTEXT ACCEPT message. In an instance where the WTRU 700 stores FII, the WTRU 700 may delete the stored FII related to the data flow and/or update its stored FII to indicate that the data flow is inactive/deleted.

In an instance where a data flow is associated with a packet filter, deletion of a data flow as described above with reference to FIG. 7 may include the deletion of the corresponding packet filter. Depending upon the implementation, deletion of a packet filter may initiate the deletion of corresponding FII. Alternatively, deletion of FII may initiate the deletion of the corresponding packet filter. Accordingly, a packet filter corresponding to the data flow described with reference to FIG. 7 may be deleted at any point during the method shown in FIG. 7.

Figure 8:
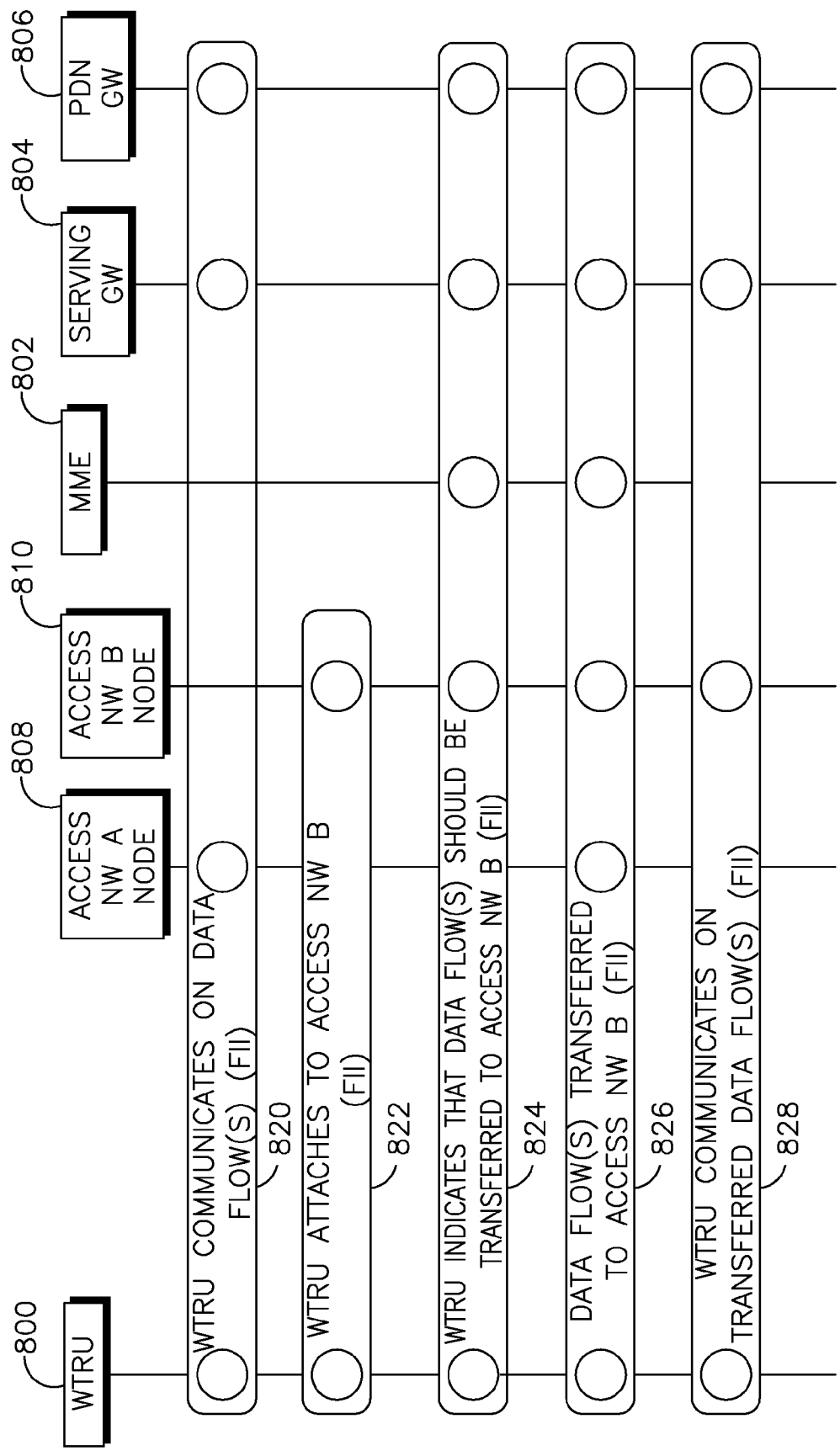
FIG. 8 shows an example method for the transfer of data flows using FII between different access networks.

FIG. 8 shows an example method for the transfer of data flows using FII between different access networks. FIG. 8 shows a WTRU 800, a MME 802, a Serving Gateway 804, and a PDN Gateway 806. The MME 802, Serving Gateway 804, and PDN Gateway 806 may be components in the same core network (not depicted). FIG. 8 also shows Access Network A Node 808, which is a node in a first access network (Access Network A). Access Network A Node 808 may be, for example, a base station or other network node, and may participate in providing an air interface to the WTRU 800. FIG. 8 further shows Access Network B Node 810, which is a node in a second access network (Access Network B). Access Network B Node 810 may be, for example, a base station or other network node, and may participate in providing an air interface to the WTRU 800. Access Network A Node 808 and Access Network B Node 810 may be capable of communicating with the WTRU 800 using different access technologies.

The WTRU 800 may communicate on one or more data flow via the Access Network A Node 808, Serving Gateway 804, and PDN Gateway 806 (step 820). The data flows may be, for example, IP flows.

The WTRU may attach to Access Network B by communicating with Access Network B Node 810 (step 822). Attaching to Access Network B may include the transmission of one or more attach messages from the WTRU 800 to Access Network B Node 810. An attach message may include one or more FII parameters related to the data flow(s) to be transferred.

The WTRU 800 may indicate that the data flow(s) should be transferred from Access Network A to Access Network B (step 824). This may include the WTRU 800 sending one or more messages ("transfer messages") related to the transfer of the data flow. The MME 802, serving 804, and/or PDN Gateway 806 may then exchange one or more messages to execute the transfer of the data flow. The transfer messages sent by the WTRU 800 and/or the one or more messages exchanged by the MME 802, Serving Gateway 804, and/or PDN Gateway 806 may include one or more FII parameters related to the data flow to be transferred.

A transfer message may indicate a request or a command for the transfer of the data flow(s). It may indicate the request or command in a Protocol Configuration Option (PCO) Information Element (IE) or other field. A transfer message may indicate that all of the flows associated with a particular PDN connection should be transferred. It may do so by including an Access Point Name (APN) associated with the PDN connection in a transfer message. Alternatively or additionally, a transfer message may include flow identifiers and one or more APNs, to indicate that all of the flows indicated by the flow identifiers and the APNs should be transferred. A transfer message may additionally include an identifier of the target access network and/or identifiers of one or more nodes in the target access network.

The WTRU may indicate that the data flow(s) should be transferred (step 824) and perform the attachment to Access Network B (step 824) concurrently. For example, an attach message may be used as a transfer message. Alternatively, the WTRU may indicate that the data flow(s) should be transferred (step 824) at any time after completion of the attachment to Access Network B (step 822). If performed at any time after completion of the attachment to Access Network B (step 822), the WTRU may indicate that the data flow(s) should be transferred (step 824) in response to a trigger and/or policy set at the WTRU. FIG. 8 shows the WTRU 800 sends a transfer message via Access Network B (step 824). Alternatively, the WTRU 800 may send a transfer message via Access Network A Node 808, or may send transfer messages via both Access Network A Node 808 and Access Network B Node 810.

The data flow(s) may then be transferred to Access Network B (step 826). The transfer of the data flow(s) may include the exchange of one or more messages between any of the WTRU 800, Access Network A Node 808, Access Network B Node 810, the MME 802, the Serving Gateway 804, and/or the PDN Gateway 806. The one or more messages used to execute the transfer(s) may include one or more FII parameters.

Upon completion of the transfer(s) of the data flow(s), the WTRU 800 may communicate on the data flow(s) via the Access Network B Node 810, Serving Gateway 804, and PDN Gateway 806 (step 820).

Using the method of FIG. 8, not all of the flows that involve Access Network A must be transferred. The WTRU may begin with any number flows on a first access network, and may transfer any subset (up to and including all) of the data flows to a second access network, and continue to communicate on un-transferred data flows on the first access network. For example, a WTRU may begin with four flows on a first access network and transfer three of the flows to a second access network. The WTRU may then communicate using the three transferred data flows on the second access network and continue to communicate using the un-transferred data flow via the first access network.

As an additional example that includes the use of the method of FIG. 8, a WTRU may receive video data via a first data flow on a first access network that is a WLAN. The WTRU may additionally receive video data via a second data flow on the first access network. The first and second data flows may be associated with the same video application. The video application may run at the application layer or above on the WTRU. The WTRU may additionally transmit and receive data related to a peer-to-peer client application via a third data flow on a second access network. The second access network may be a cellular access network. The second access network may be, for example, an E-UTRAN or a WiMax network. The WTRU may transfer the first data flow to the second access network, and then receive the video data via the first data flow on the second access network. At a later time, the WTRU may transfer the first data flow back to the first access network, and then subsequently receive the video data via the first data flow on the first access network.

The network nodes of FIGS. 4-8 (such as MMEs 402, 502, 602, 702, 802, Serving Gateways 404, 604, 704, 804, and PDN Gateways 406, 506, 606, 706, 806) are provided purely by way of example, and, in various implementations, additional or different network nodes may be used. For example, in an instance where a WTRU accesses a core network using General Packet Radio Service (GPRS), a Gateway GPRS Support Node (GGSN) may be involved in the creation, modification, and deletion of data flows. A GGSN may create, modify, and/or store FII to reflect the creation, modification, and deletion, of data flows. A GGSN may create, modify, and/or store FII in response to an event such as, for example, the creation of a Packet Data Protocol (PDP) context related to one or more data flows.

In addition or as an alternative to the examples provided above with reference to FIGS. 4-8, a data flow may be created, deleted, or updated whenever session management signaling messages are exchanged between a WTRU and one or more nodes in a core network. A data flow may be modified (created, deleted, or updated) at a WTRU a network node, based on a trigger or policy stored at the WTRU. If it is not possible to send an update message directly following the modification, information related to the modification may be stored at the WTRU. At the next opportunity, one or more messages may be sent to indicate that the modification has occurred.

A WTRU may send a message to a core network in response to the modification (creation, deletion, or updating) of a data flow, to notify the core network of the modification. One or more nodes in a core network may similarly send a notification message to a WTRU to notify the WTRU that a data flow has been modified. For example, a WTRU may locally deactivate an EPS bearer, and then send a message to inform the core network that a data flow communicated on the bearer has been deleted. As an additional example, a network node such as an MME or SGSN may deactivate an unused EPS bearer context that is still considered by a WTRU to be active. The network node may then send a message to inform the WTRU that a data flow communicated on the bearer has been deleted.

In addition or as an alternative to the examples provided above, a binding update message may be sent in response to the modification (creation, deletion, or updating) of a data flow. The binding update message may be sent when a mobility protocol such as MIP, P-MIP, or other protocol is used. When FII is modified at a WTRU, a WTRU may send an update message to the Serving Gateway that is serving the WTRU. The Serving Gateway may then send a corresponding binding update message to a PDN Gateway by which the WTRU receives data. Alternatively or additionally, when FII is modified at a Serving Gateway, the Serving Gateway may send a corresponding binding update message to a PDN Gateway.

Figure 9:
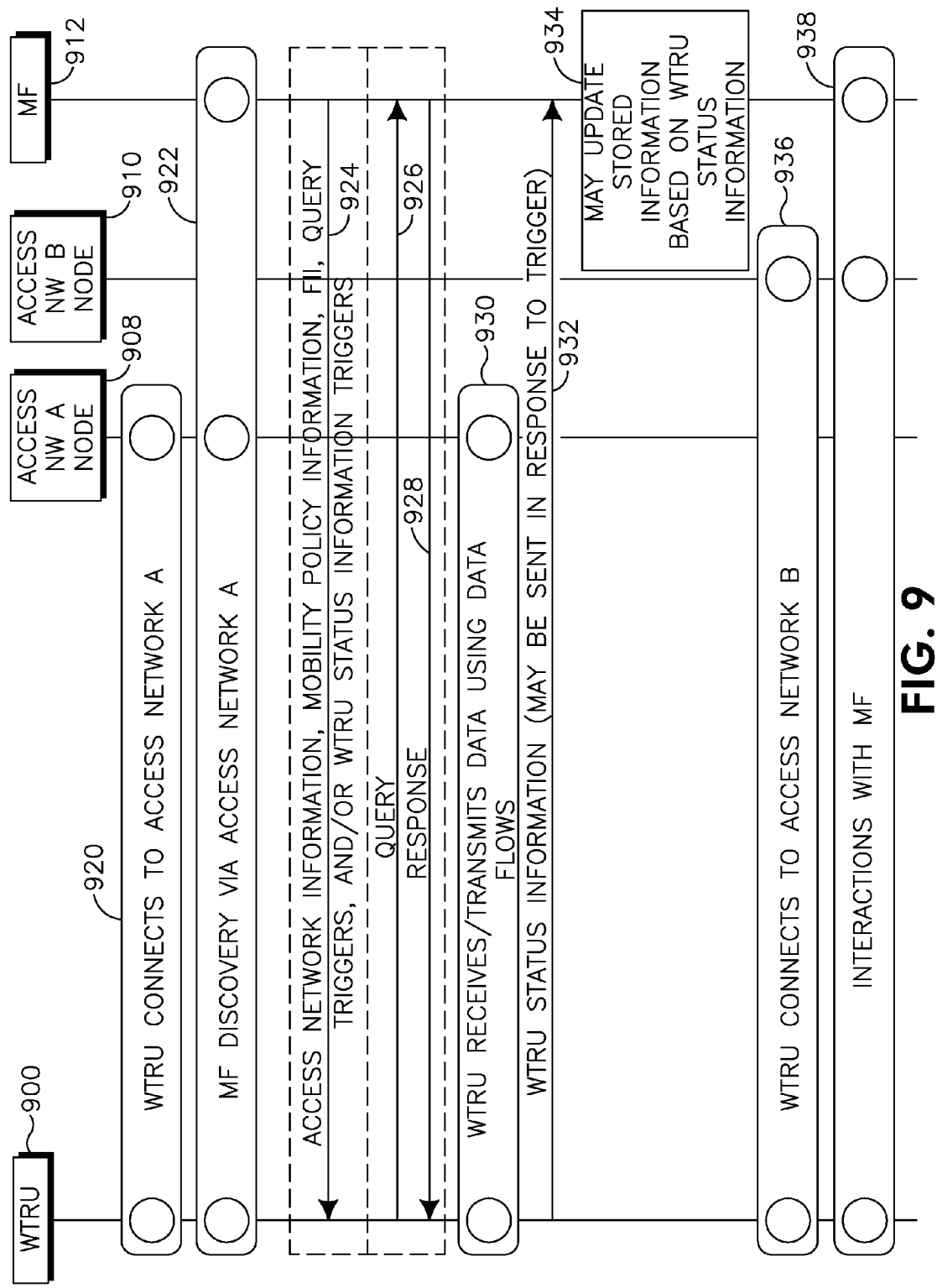
FIG. 9 shows an example method for interactions between a WTRU and a Mobility Function.

FIG. 9 shows an example method for interactions between a WTRU 900 and a MF 912. The MF 912 may be a component of or connected to a core network (not depicted). FIG. 9 also shows Access Network A Node 908, which is a node in a first access network (Access Network A). Access Network A Node 908 may be, for example, a base station or other network node, and may participate in providing an air interface to the WTRU 900. FIG. 9 further shows Access Network B Node 910, which is a node in a second access network (Access Network B). Access Network B Node 910 may be, for example, a base station or other network node, and may participate in providing an air interface to the WTRU 900. Access Network A Node 908 and Access Network B Node 910 may be capable of communicating with the WTRU 900 using different access technologies.

The WTRU 900 may connect to Access Network A by communicating with Access Network A Node 908 (step 920). Attaching to Access Network A may include the transmission of one or more attach messages from the WTRU 900 to Access Network A Node 908. An attach message may include one or more FII parameters.

The WTRU 900 may perform a discovery procedure via Access Network A to locate the MF 912 (step 922). The discovery procedure may be based on, for example, Domain Name Service (DNS), Dynamic Host Configuration Protocol (DHCP), and/or one or more other protocols.

The MF 912 may transmit information to the WTRU 900 via Access Network A Node 908 (step 924). The MF 912 may send this information to the WTRU 900 pursuant to a push mechanism. The information may include any of the access network information, mobility policy information, and/or FII parameters described above, and/or other parameters. The information may additionally or alternatively include information related to query triggers and/or WTRU status information triggers.

In addition to or as an alternative to a push mechanism, the WTRU 900 may send one or more query messages to the MF 912 via Access Network A Node 908 (step 926). The query messages may indicate queries related to access network information, mobility policy information, and/or FII, as described above with reference to FIG. 1. The query messages may be sent in response to a query trigger.

The MF 912 may send one or more response messages to the WTRU 900 via Access Network A Node 908 that include information responsive to the one or more query messages (step 928).

The WTRU 900 may communicate using one or more data flows via Access Network A (step 930). This may involve the communication of data related to or more applications. The WTRU may make a determination that the data flows should be used over Access Network A based on access network information, mobility policy information, and/or FIT received from the MF 912., and may communicate using Access Network A based on the determination.

The WTRU 900 may send WTRU status information to the MF 912 via Access Network A Node 908 (step 932). The WTRU status information may include one or more WTRU status information parameters as described above with reference to FIG. 1. The WTRU status information may be sent by the WTRU 900 based on one or more WTRU status information triggers as described above with reference to FIG. 1. The MF 912 may update information it is storing based on the received WTRU status information (step 934).

The WTRU 900 may connect to Access Network B by communicating with Access Network B Node 910 (step 936). Attaching to Access Network B may include the transmission of one or more attach messages from the WTRU 900 to Access Network B Node 910. An attach message may include one or more FIT parameters as described above with reference to FIG. 8. The WTRU 900 may continue to be connected to Access Network A, or may terminate the connection to Access Network A after the connection to Access Network B is established. After connecting to Access Network B, the WTRU 900 may interact with the MF 912 (step 938) according to any of the interactions described above as taking place via Access Network A (steps 922, step 924, step 926, step 928, step 930, step 932, and/or step 934). Before connecting to Access Network B (step 936), the WTRU 900 may make a determination that the connection should be made. This determination may be based on, for example, the access network information, mobility policy information (including but not limited to data flow mobility information), and/or FII received from the MF 912.

Figure 10:
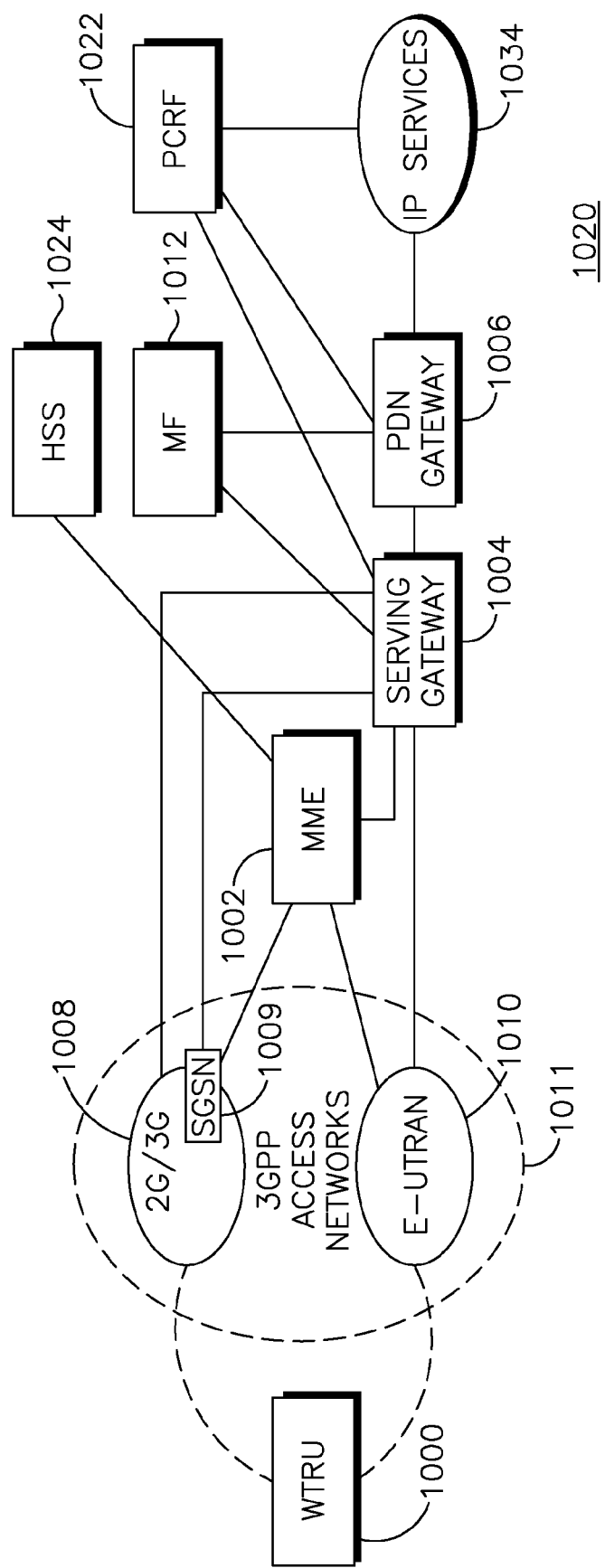
FIG. 10 shows an example non-roaming network architecture that may include a Mobility Function.

FIG. 10 shows an example network architecture 1020 that may include a MF 1012. The example network architecture 1020 may further include a WTRU 1000, a MME 1002, a Serving Gateway 1004, a HSS 1024, a PDN Gateway 1006, a Policy and Charging Rules Function (PCRF), an IP services subsystem 1034, and one or more access networks 1011. The access networks 1011 may, though need not, be based on Third Generation Partnership Project (3GPP) technologies. The access networks 1011 may include, for example, an E-UTRAN 1010 and/or a 2G/3G access network 1008. The 2G/3G access network may be based on a technology such as GSM/GRPS or UTRAN. The 2G/3G access network 1008 may include a network node such as a SGSN 1009. The IP services subsystem 1034 may be, for example, an IP Multimedia Subsystem (IMS) or a Packet-switched Streaming Service (PSS) subsystem. The example architecture 1020 may be used, for example, in instances where the WTRU 1000 is in a non-roaming state.

The WTRU 1000 may be connected to the one or more access networks 1011. The MME 1002 may be connected to the SGSN 1009, the E-UTRAN 1010, the Serving Gateway 1004, and/or the HSS 1024. The Serving Gateway 1004 may additionally be connected to the SGSN 1009, the 2G/3G network 1008, the PDN Gateway 1006, and/or the PCRF 1022. The PDN Gateway 1006 may additionally be connected to the PCRF 1022 and/or the IP services subsystem 1034.

The MF 1012 may be connected to the Serving Gateway 1004 and/or the PDN Gateway 1006. The MF 1012, the Serving Gateway 1004, and/or the PDN Gateway may exchange one or more messages related to, for example, changes in FII or other information.

Figure 11:
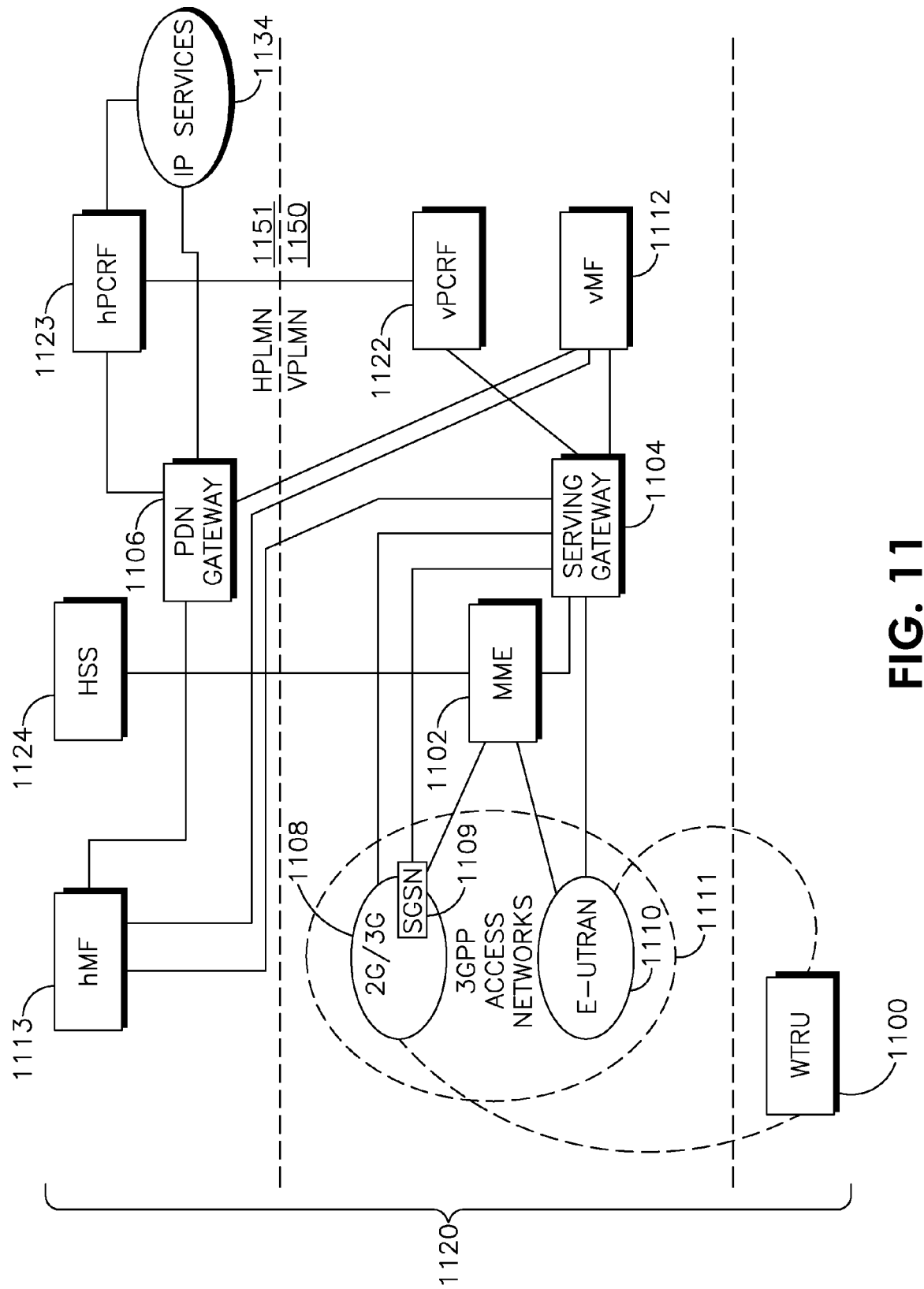
FIG. 11 shows an example roaming architecture that may include a Visited Mobility Function and a Home Mobility Function.

FIG. 11 shows an example network architecture 1120 that may include a Visited Public Land Mobile Network (VPLMN) that may include a Visited Mobility Function (vMF) 1112 and a Home Public Land Mobile Network (HPLMN) that may include a Home Mobility Function (hMF) 1113. The VPLMN may further include a MME 1102, a Serving Gateway 1104, a Visited PCRF (vPCRF) 1122, and one or more access networks 1111. The access networks 1111 may, though need not, be based on 3GPP technologies. The access networks 1111 may include, for example, an E-UTRAN 1110 and/or a 2G/3G access network 1108. The 2G/3G access network may be based on a technology such as GSM/GRPS or UTRAN. The 2G/3G access network 1108 may include a network node such as a SGSN 1109. The HPLMN 1151 may further include a HSS 1124, a PDN Gateway 1106, a hPCRF 1123, and an IP services subsystem 1134. The IP services subsystem 1134 may be, for example, an IMS or a PSS subsystem. The example network architecture 1120 may include a WTRU 1100, which may connect to the one or more access networks 1111. The example network architecture 1120 of FIG. 11 may be used when the WTRU 1100 is roaming.

The MME 1102 may be connected to the SGSN 1109, the E-UTRAN 1110, the Serving Gateway 1104, and/or the HSS 1124. The Serving Gateway 1104 may additionally be connected to the SGSN 1109, the 2G/3G access network 1108, the PDN Gateway 1106, and/or the vPCRF 1122. The vPCRF 1122 may additionally be connected to the hPRCF 1123. The IP services subsystem 1134 may be connected to the PDN gateway 1106 and/or the hPCRF 1123. The hPCRF 1123 may additionally be connected to the PDN Gateway 1106.

The hMF 1113 may be connected to the Serving Gateway 1104, the vMF 1112, and/or the PDN Gateway 1106. The vMF 1112 may additionally be connected to the PDN Gateway 1106. The interfaces between the hMF 1113 and vMF 1112 and the PDN Gateway 1106 and Serving Gateway 1104 may be used for communicating data in the context of handover. These interfaces may be used, for example, when the PDN Gateway 1106 and/or Serving Gateway 1104 implement P-MIP functionality. In an instance where P-MIP is used, mobility of the WTRU 1100 between access networks and/or the creation of new data flow may result in the creation and/or modification of corresponding FII. Updates the FII may be communicated between the PDN Gateway 1106 and the Serving Gateway 1104. The interface between the hMF 1113 and the vMF 1112 may be, for example, an S14 interface. When FII is created or modified, in an instance where P-MIP is used or otherwise, the hMF 1113 and vMF 1112 may exchange mobility policy information that reflects changes in the created/modified FII.

In various implementations, the vMF 1112 may not exist in the VPLMN 1150. In such a circumstance, the WTRU 1100 may communicate with the hMF 1113 via a tunnel through the Serving Gateway 1104.

Figure 12:
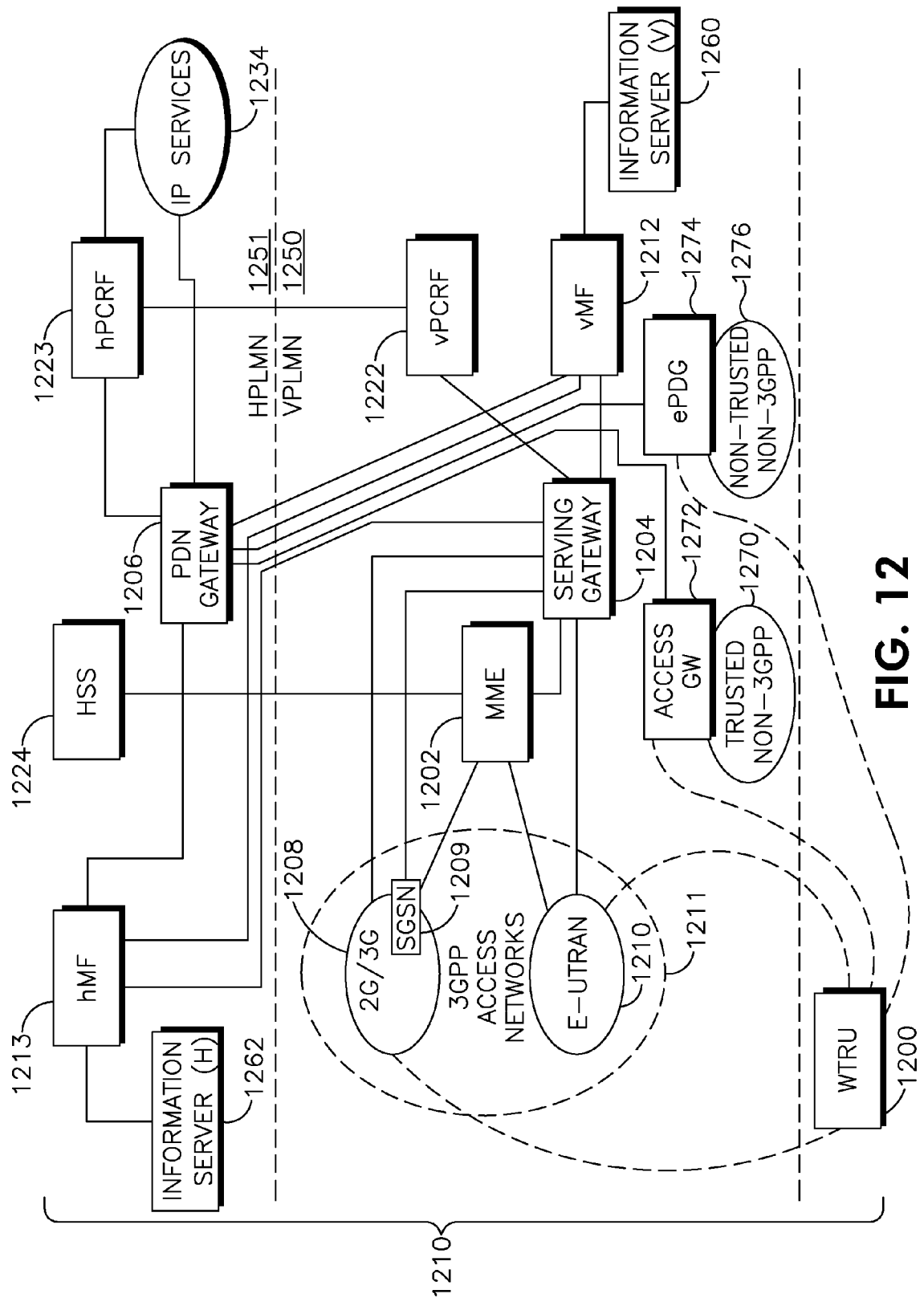
FIG. 12 shows a first example roaming architecture that may include a Visited Mobility Function, a Home Mobility Function, and that further may include information servers.

FIG. 12 shows an example network architecture 1220 that may include a vMF 1212, a hMF 1213, and additional information servers 1260, 1262. The example network architecture may include a VPLMN 1250 and a HPLMN 1251. The VPLMN may include a MME 1202, a Serving Gateway 1204, a vPCRF 1222, and one or more access networks 1211. The access networks 1211 may, though need not, be based on 3GPP technologies. The access networks 1211 may include, for example, an E-UTRAN 1210 and/or a 2G/3G access network 1208. The 2G/3G access network may be based on a technology such as GSM/GRPS or UTRAN. The 2G/3G access network 1208 may include a network node such as a SGSN 1209. The VPLMN 1250 may additionally include an Access Gateway 1272, which may participate in providing a trusted non-3GPP access network 1270. The VPLMN 1250 may also include an Evolved Packet Data Gateway (ePDG) 1274, which may participate in providing a non-trusted non-3GPP access network 1276. The example network architecture 1220 may include a WTRU 1200, which may connect to the one or more access networks 1211, the trusted non-3GPP access network 1270, and/or the non-trusted non-3GPP access network 1276. The example network architecture 1220 of FIG. 12 may be used when the WTRU 1200 is roaming.

The HPLMN 1251 may include a HSS 1224, a PDN Gateway 1206, a hPCRF 1223, and an IP services subsystem 1234. The IP services subsystem 1234 may be, for example, an IP Multimedia Subsystem (IMS) or a PSS subsystem.

The MME 1202 may be connected to the E-UTRAN 1210, the Serving Gateway 1204, the SGSN 1209, and/or the HSS 1224. The Serving Gateway additionally may be connected to the E-UTRAN 1210, the SGSN 1209, the 2G/3G access network 1208, the PDN Gateway 1206, and/or the vPCRF 1222. The PDN Gateway 1206 additionally may be connected to the Access Gateway 1272, the ePDG 1274, the IP services subsystem 1234, and/or the hPCRF 1223. The hPCRF 1223 may additionally be connected to the IP services subsystem 1234.

The vMF 1212 may be connected to the Visited Information Server 1260, the Serving Gateway 1204, the PDN Gateway 1206, and/or the hMF. The hMF 1213 may be connected to the PDN Gateway 1206, the Serving Gateway 1204, and the Home Information Server 1262.

In various implementations, the hMF 1213, vMF 1212, Home Information Server 1262 and Visited Information Server 1260 may implement different functionalities. For example, the hMF 1213 may be a Home ANDSF (hANDSF) and the vMF 1212 may be a Visited ANDSF. One or both of the Home Information Server 1262 and/or Visited Information Server 1260 may be MIH Servers, User Data Convergence (UDC) servers, and/or other servers. The hMF 1213, vMF 1212, Home Information Server 1262, and/or Visited Information Server 1260 may store and/or exchange information such as subscriber information, access network information, mobility policy information (including but not limited to data flow mobility information), FII, and/or WTRU status information.

Figure 13:
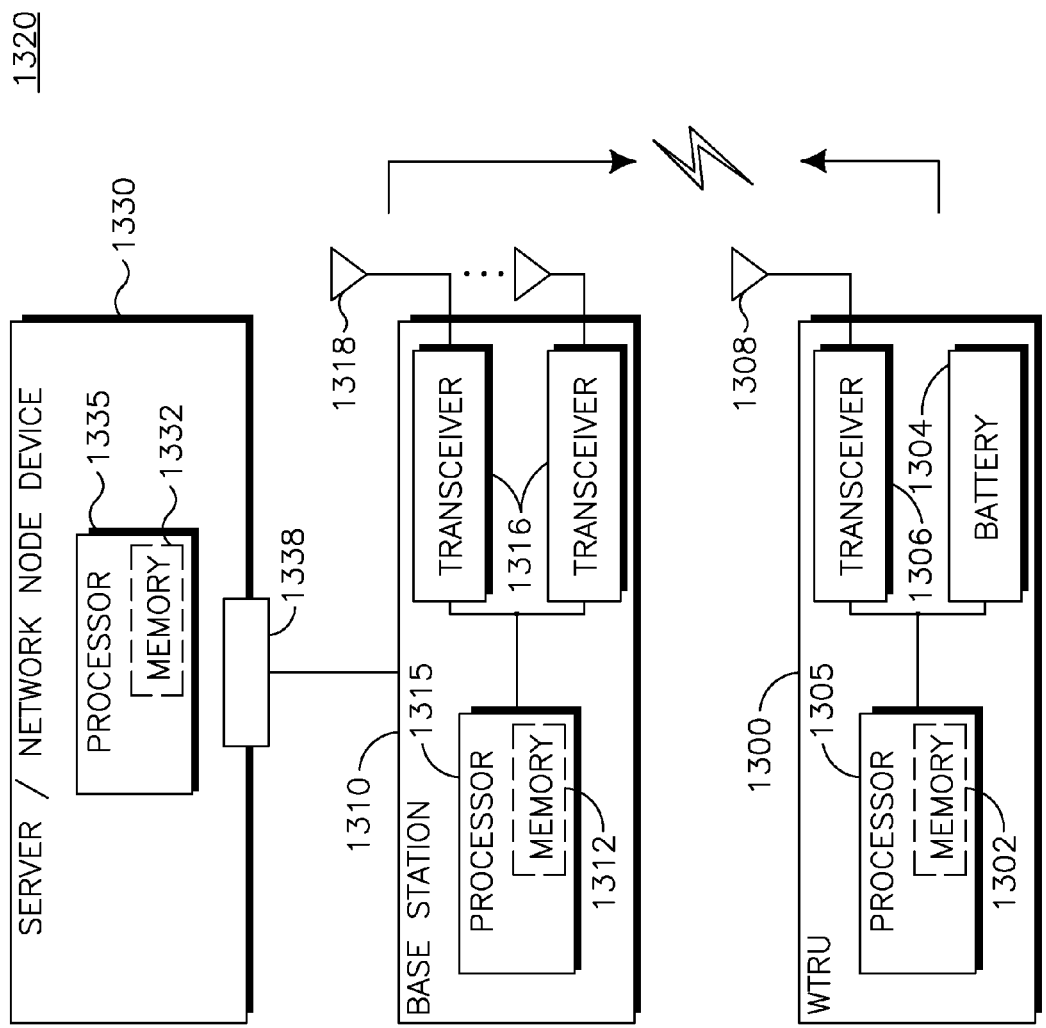
FIG. 13 provides a detailed view of a WTRU, a base station, and other network elements described with reference to FIGS. 1-12.

FIG. 13 provides a more detailed view of components shown above with references to FIGS. 1-12. FIG. 13 shows a wireless communication system/access network 1320 that may be configured to implement the features and methods described above with reference to FIGS. 1-12. The wireless communication system may include a WTRU 1300, a base station 1310, and a server/network node 1330.

In addition to the components that may be found in a typical WTRU, the WTRU 1300 may include a processor 1305 with a linked memory 1302, at least one transceiver 1306, a battery 1304, and an antenna 1308. The processor 1305 may be configured to generate and/or process messages and other data as described above with reference to FIGS. 1-12. The transceiver 1306 is in communication with the processor 1305 and the antenna 1308 to facilitate the transmission and reception of wireless data. In case a battery 1304 is used in the WTRU 1300, it may power the transceiver 1306 and/or the processor 1305. In addition to the transceiver 1306 shown in FIG. 13, the WTRU 1300 may include one or more additional transceivers (not depicted). The transceiver 1306 may be a single-mode transceiver, or may be a multi-mode transceiver that is capable of communicating using two or more different RATs. The one or more additional transceivers (not depicted) may also each be single- or multi-mode transceivers. The WTRU 1300 may be capable of performing functionality attribute to any WTRU or combination of WTRUs described above with reference to FIGS. 1-12.

In addition to the components that may be found in a typical base station, the base station 1310 may include a processor 1315 with a linked memory 1312, transceivers 1316, and antennas 1321. The processor 1317 may be configured to generate and/or process messages and other data as described above with reference to FIGS. 1-12. The transceivers 1319 are in communication with the processor 1317 and antennas 1321 to facilitate the transmission and reception of wireless data. The base station may be capable of performing functionality attribute to any base station, access network node, or combination of any base stations or access network nodes described above with reference to FIGS. 1-12.

The server/network node device 1330 may include a processor 1335 and a linked memory 1332. The server/network node device 1338 may include a communications interface 1338, which is configurable to transmit and/or receive data to/from the base station 1310 and/or other network nodes (not depicted). The communications interface 1338 may be or include a transceiver. The communications interface 1338 may operate using wired or wireless communications technology. The communications interface may be capable of communicating with the base station 1310 and/or other network nodes based on technologies such as, for example, Ethernet, Carrier Ethernet, fiber optics, microwave, xDSL (Digital Subscriber Line), Asynchronous Transfer Mode, (ATM), Signaling System 7 (SS7), Internet Protocol (IP), and/or IP/Multiprotocol Label Switching (MPLS). The server/network node device may be capable of implementing functionality attributed to one or any combination of servers and/or network nodes described above with reference to FIGS. 1-12. For example, the server/network node device may implement functionality described above as performed by a MF, MME, Serving Gateway, PDN Gateway, PCRF, AAA Proxy, HSS, or any combination thereof. The processor 1335 may be configured to generate and/or process messages and other data as described above with reference to the servers and/or network nodes described above in FIGS. 1-12. The server/network node device 1330 may include one or more software modules (not depicted), which, when executed by the processor 1335, implement functionality described above with reference to FIGS. 1-12. Suitable software modules include, by way of example, an executable program, a function, a method call, a procedure, a routine or sub-routine, one or more processor-executable instructions, a script or macro, an object, or a data structure.

Although features and elements are described above with reference to FIGS. 1-13 in particular combinations, each feature or element can be used alone without the other features and elements or in various combinations with or without other features and elements. The sub-elements of the methods or flowcharts described above with reference to FIGS. 1-13 may be realized in any order (including concurrently), in any combination or sub-combination. The methods or flow charts described above with reference to FIGS. 1-13 may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A wireless transmit/receive unit (WTRU), the WTRU comprising:
   a transmitter configured to transmit a request for the mobility policy information, the mobility policy information including first and second access network information and data flow information; and
   a processor configured to make a determination based on the mobility policy information to transfer at least one of: a first Internet Protocol (IP) data flow or a second IP data flow from a first access network of a first radio access technology (RAT) to a second access network of a second RAT, the data flow information including at least one of:
   a first application type identifier corresponding to the first IP data flow, or
   a second application type identifier corresponding to the second IP data flow, the mobility policy information indicating a preference, via the at least one of the first application type identifier or the second application type identifier, of the second access network of the second RAT for the at least one of the first IP data flow or the second IP data flow.

2. The WTRU of claim 1 further comprising:
   a receiver configured to receive the mobility policy information from a mobility function.

3. The WTRU of claim 2 wherein:
   the transmitter is further configured to transmit the request for the mobility policy information in response to a trigger condition, wherein the trigger condition relates to at least one of: a power-up of the WTRU; expiration of a time period; a change in a location of the WTRU; a change of access network of the WTRU; a change of battery power level of the WTRU; or a change of applications running on the WTRU; and
   wherein the receiver is further configured to receive the mobility policy information from the mobility function in response to the request for the mobility policy information.

4. The WTRU of claim 3 wherein the receiver is further configured to receive information defining the trigger condition from the mobility function.

5. The WTRU of claim 2 wherein the transmitter is further configured to transmit WTRU status information to the mobility function, and wherein the WTRU status information indicates at least one of: an access network to which the WTRU is connected; one or more flow identification information parameters associated with at least one of the first Internet Protocol (IP) data flow or the second IP data flow; statistics on usage of the mobility policy information by the WTRU; a preference of the WTRU for an access network; or a preference of the WTRU for a type of RAT.

6. The WTRU of claim 1 wherein the mobility policy information indicates at least one of: whether data flow mobility between the first access network and the second access network is permitted; whether multiple Packet Data Network (PDN) connections are permitted on the first access network or the second access network; a maximum number of PDN connections that are permitted on the first access network or the second access network; whether a PDN connection is permitted via the first access network or the second access network; or whether a PDN connection is permitted on a type of RAT.

7. The WTRU of claim 1 wherein the at least one of the first Internet Protocol (IP) data flow or the second IP data flow is a Long Term Evolution (LTE) Internet Protocol (IP) flow.

8. The WTRU of claim 1, wherein the processor is further configured to implement Access Network Discovery Function (ANDSF) functionality to receive the mobility policy information.

9. The WTRU of claim 1, wherein the at least one of the first application type identifier or the second application type identifier further corresponds to at least one of: a streaming video application, a web browser application, a file transport protocol (FTP) application, a voice-over-Internet (VoIP) application, or an electronic mail (email) application.

10. The method of claim 1, wherein the at least one of the first application type identifier or the second application type identifier further corresponds to at least one of: a streaming video application, a web browser application, a file transport protocol (FTP) application, a voice-over-Internet (VoIP) application, or an electronic mail (email) application.

11. A method for use in a wireless transmit/receive unit (WTRU), the method comprising:
    transmitting a request for a mobility policy information, the mobility policy information including a first and a second access network information and data flow information; and
    making a determination based on the mobility policy information to transfer at least one of: a first Internet Protocol (IP) data flow or a second IP data flow from a first access network of a first radio access technology (RAT) to a second access network of a second RAT, the data flow information including at least one of:
    a first application type identifier corresponding to the first IP data flow, or
    a second application type identifier corresponding to the second IP data flow, the mobility policy information indicating a preference, via the at least one of the first application type identifier or the second application type identifier, of the second access network of the second RAT for the at least one of the first IP data flow or the second IP data flow.

12. The method of claim 11 further comprising:
    receiving the mobility policy information from a mobility function.

13. The method of claim 12, further comprising:

transmitting a request for the mobility policy information in response to the trigger condition, wherein the trigger condition relates to at least one of: a power-up of the WTRU;

expiration of a time period; a change in a location of the WTRU; a change of access network of the WTRU; a change of battery power level of the WTRU; or a change of applications running on the WTRU; and wherein the receiving the mobility policy information from the mobility function is performed in response to the request for the mobility policy information.

14. The method of claim 13 further comprising:

receiving information defining the trigger condition from the mobility function.

15. The method of claim 12 further comprising:

transmitting WTRU status information to the mobility function, wherein the WTRU status information indicates at least one of: an access network to which the WTRU is connected;

one or more flow identification information parameters associated with the at least one of the first Internet Protocol (IP) data flow or the second IP data flow; statistics on usage of the mobility policy information by the WTRU; a preference of the WTRU for an access network; or a preference of the WTRU for a type of RAT.

16. The method of claim 11 wherein the mobility policy information indicates at least one of: whether data flow mobility between the first access network and the second access network is permitted; whether multiple Packet Data Network (PDN) connections are permitted on the first access network or the second access network; a maximum number of PDN connections that are permitted on the first access network or the second access network;

whether a PDN connection is permitted via the first access network or the second access network; or whether a PDN connection is permitted on a type of RAT.

17. The method of claim 11 wherein the at least one of the first Internet Protocol (IP) data flow or the second IP data flow is a Long Term Evolution (LTE) Internet Protocol (IP) flow.

18. The method of claim 11, further including implementing Access Network Discovery Function (ANDSF) functionality to receive the mobility policy information.

\* \* \* \* \*

UNITED STATES PATENT AND TRADEMARK OFFICE
CERTIFICATE OF CORRECTION

PATENT NO. : 9,042,373 B2
APPLICATION NO. : 12/684227
DATED : May 26, 2015
INVENTOR(S) : Lu et al.

Page 1 of 1

It is certified that error appears in the above-identified patent and that said Letters Patent is hereby corrected as shown below:

In the claims,

Column 20, line 38, delete "claim 1" and add --claim 11--.

Signed and Sealed this
Eighth Day of March, 2016

Michelle K. Lee
*Director of the United States Patent and Trademark Office*